United States Patent [19]

Shepardson et al.

[11] 4,056,710
[45] Nov. 1, 1977

[54] SYSTEM FOR DECODING BAR CODE

[75] Inventors: Robert C. Shepardson, Cupertino; Michael E. Watts, Woodside, both of Calif.

[73] Assignee: Coherent Radiation, Palo Alto, Calif.

[21] Appl. No.: 677,715

[22] Filed: Apr. 16, 1976

[51] Int. Cl.² ............................ G06K 7/08; G06F 15/34
[52] U.S. Cl. ................................ 235/437; 235/463; 235/494
[58] Field of Search ............... 235/61.11 E, 61.12 N, 235/61.7 R; 340/146.3 K, 146.3 F, 146.3 Z

[56] References Cited

U.S. PATENT DOCUMENTS

| 3,906,203 | 9/1975 | Butulis | 235/61.11 E |
| 3,986,000 | 10/1976 | McJohnson | 235/61.11 E |
| 3,987,278 | 10/1976 | Ven Elzakker et al. | 235/61.11 E |

Primary Examiner—Vincent P. Canney
Attorney, Agent, or Firm—Limbach, Limbach & Sutton

[57] ABSTRACT

A system for decoding encoded character information characterized by a plurality of bars of alternating light reflective characteristics of one or more widths in applications such as reader/scanner systems utilizing a decision tree technique that enables decoding to take place on line in real time.

3 Claims, 14 Drawing Figures

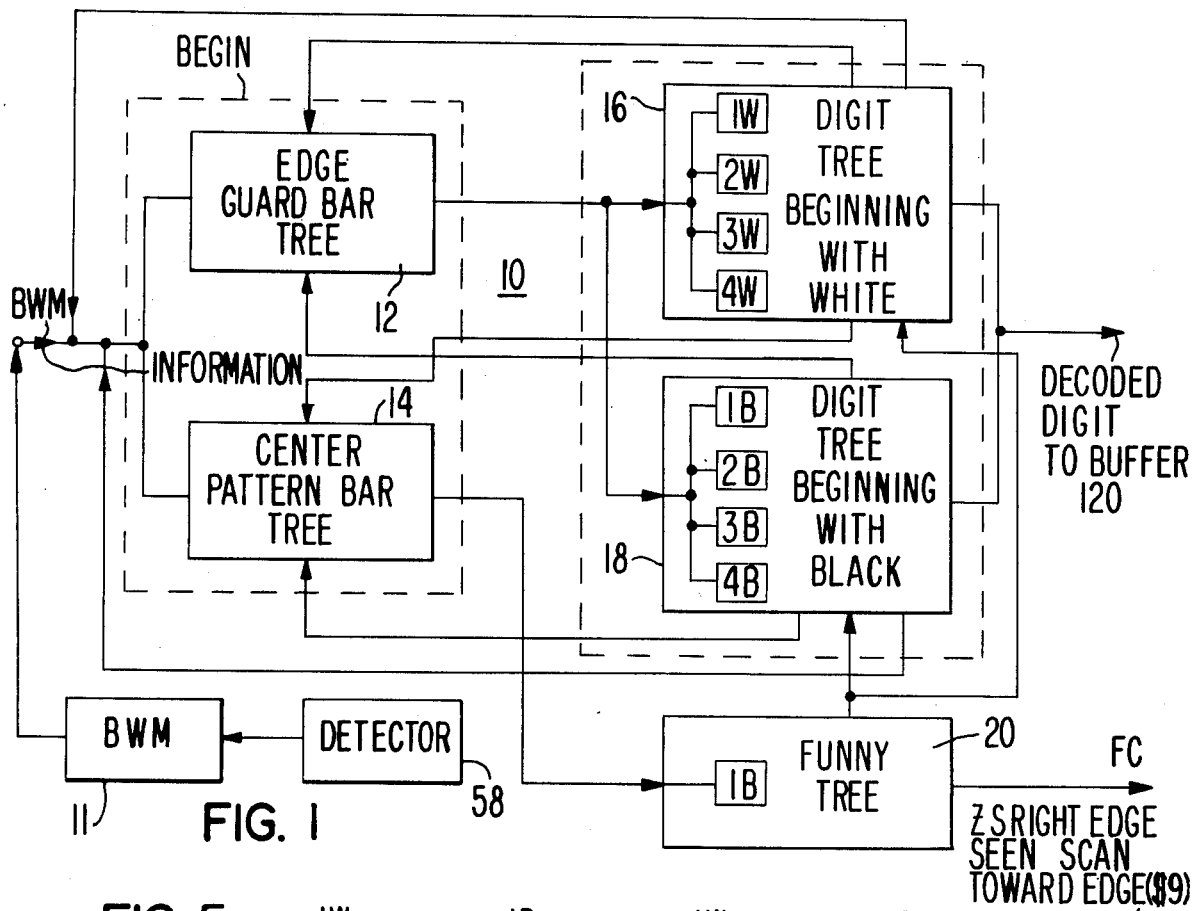
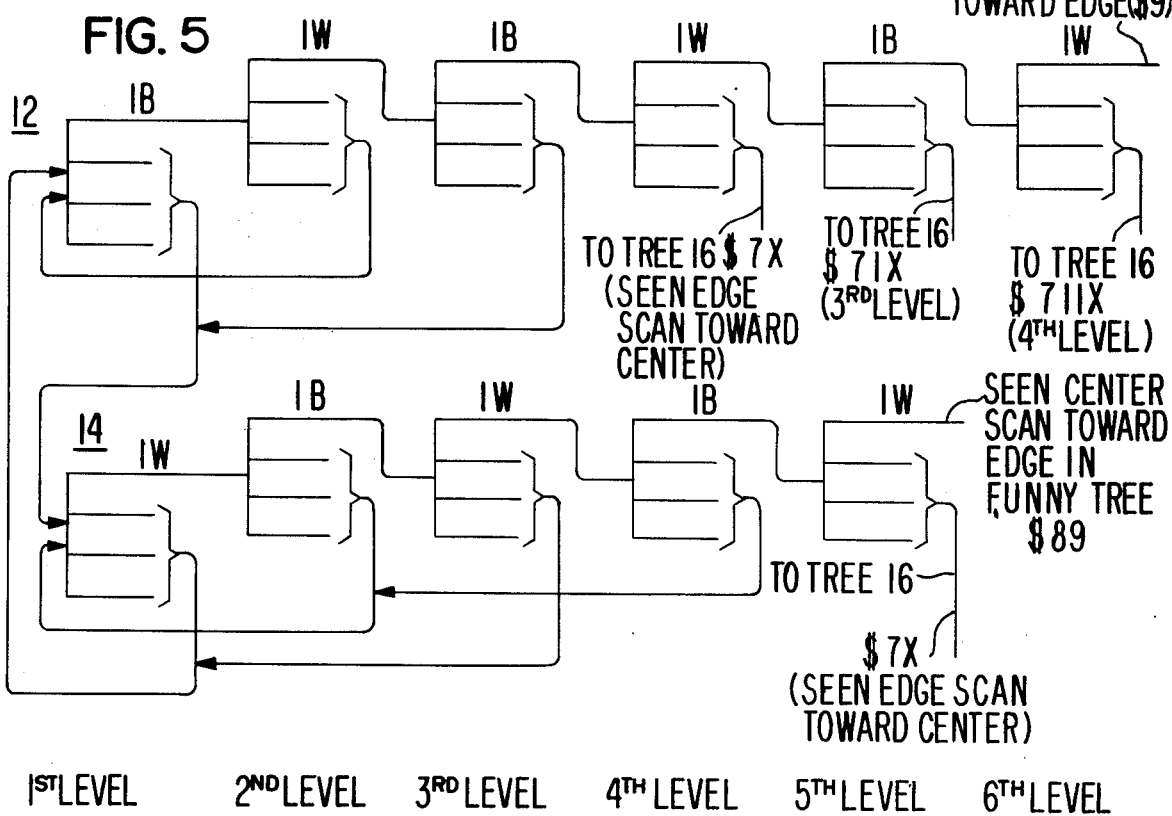

DIGIT TREE 16
(STARTING WITH WHITE)

FIG. 3B
DIGIT TREE
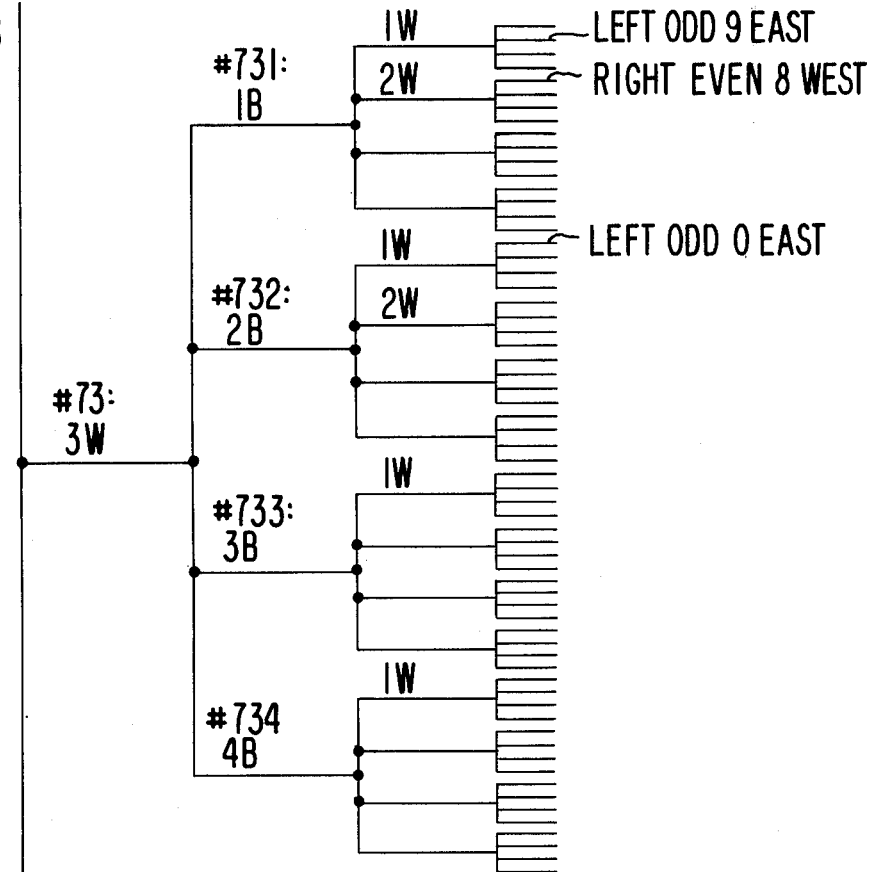
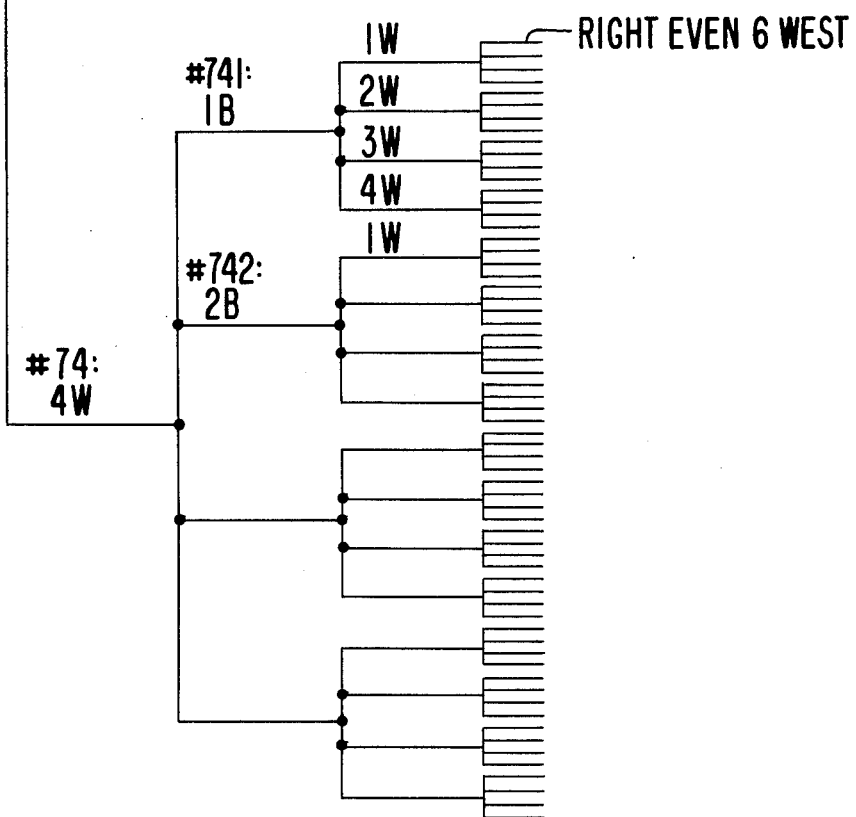

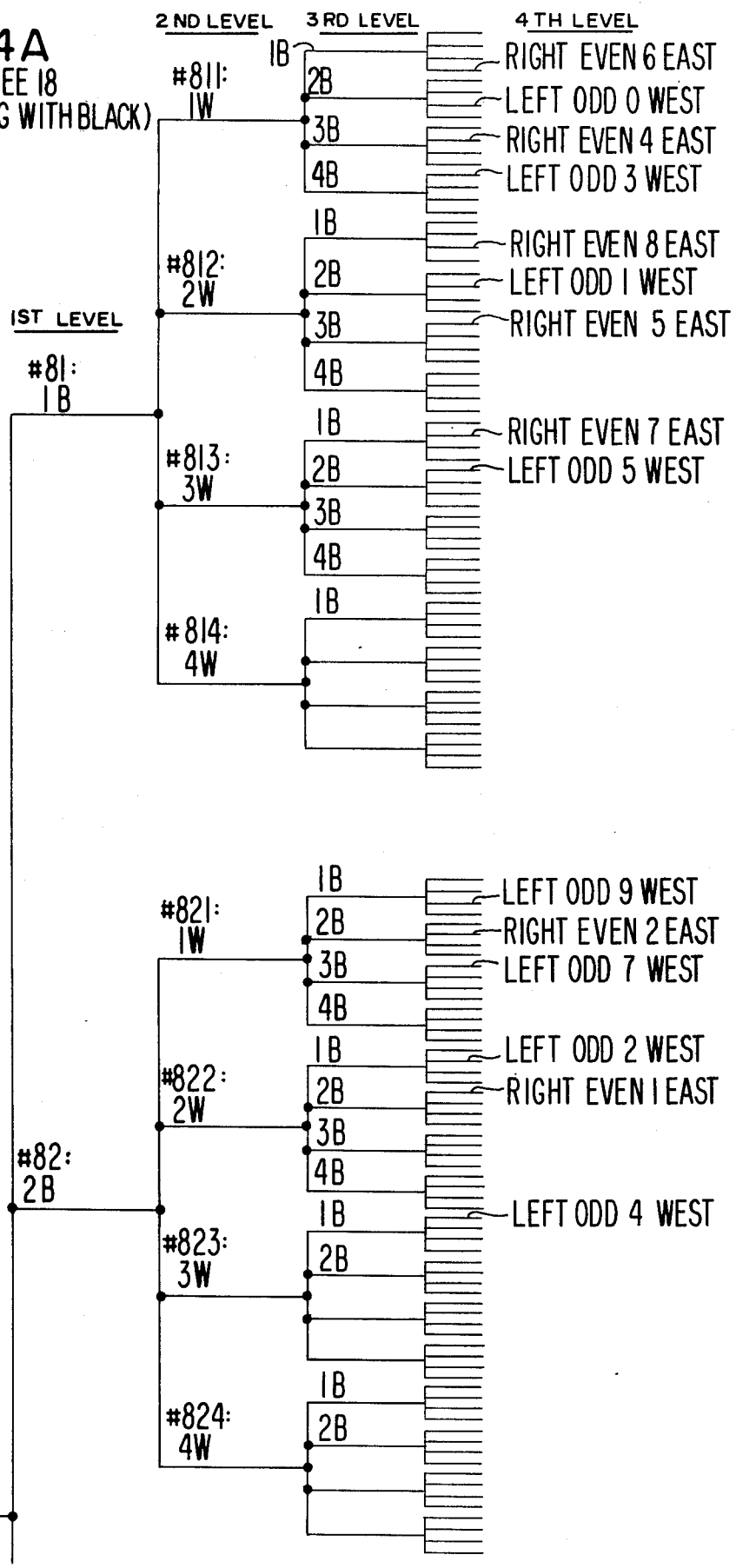

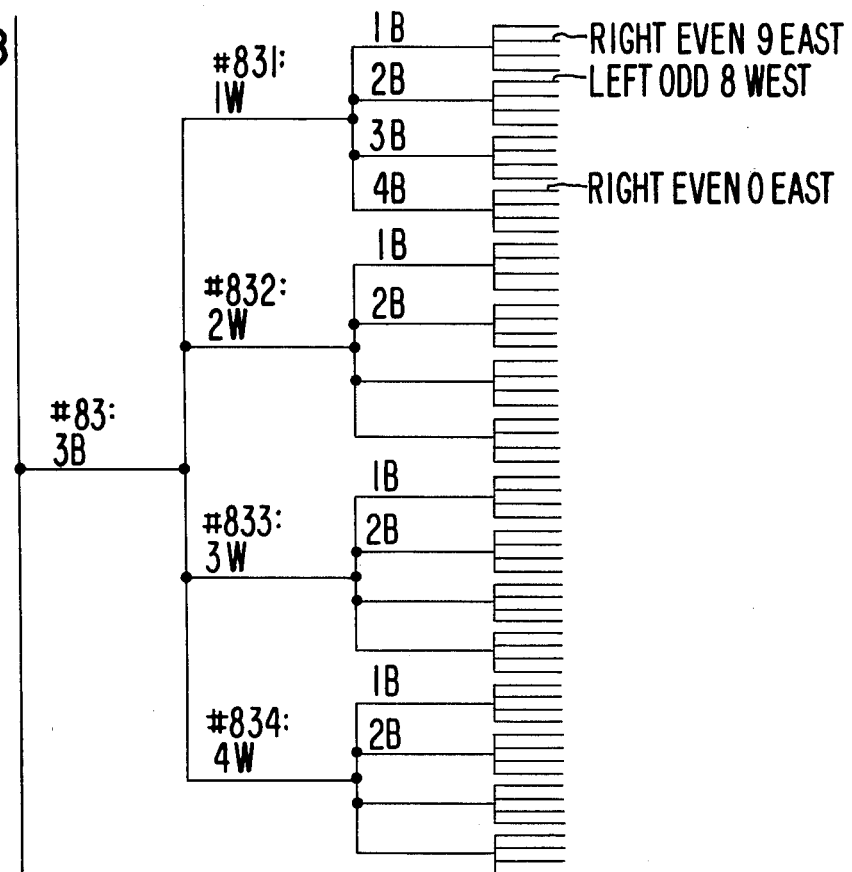
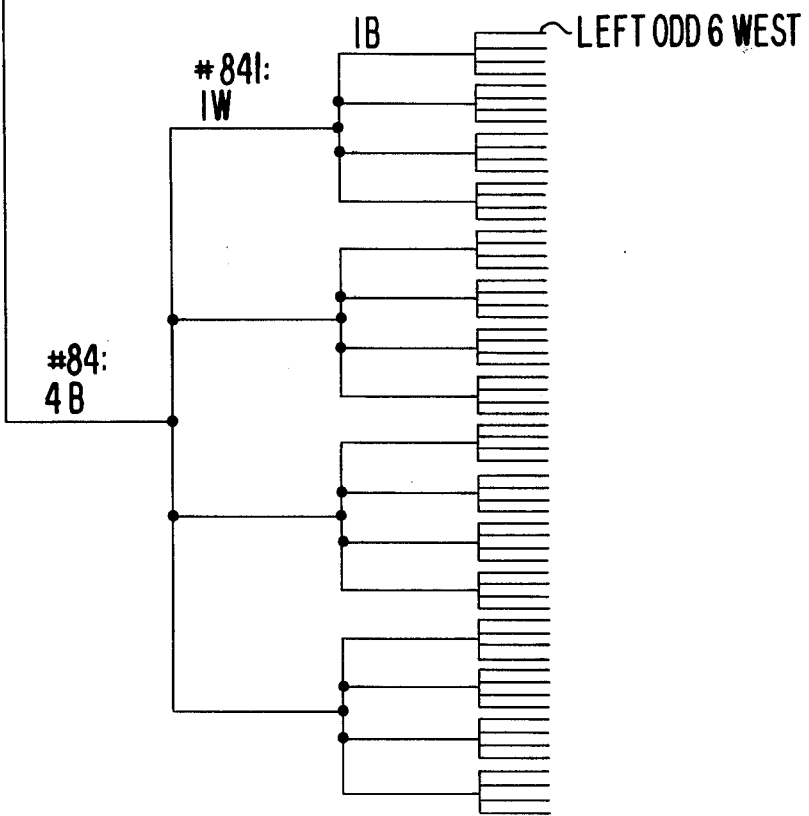
FIG. 4B
DIGIT TREE

FUNNY TREE

FIG. 8A
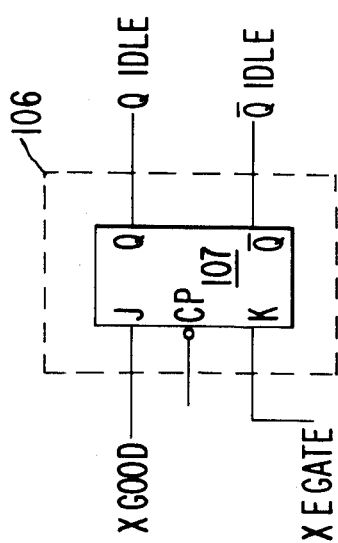
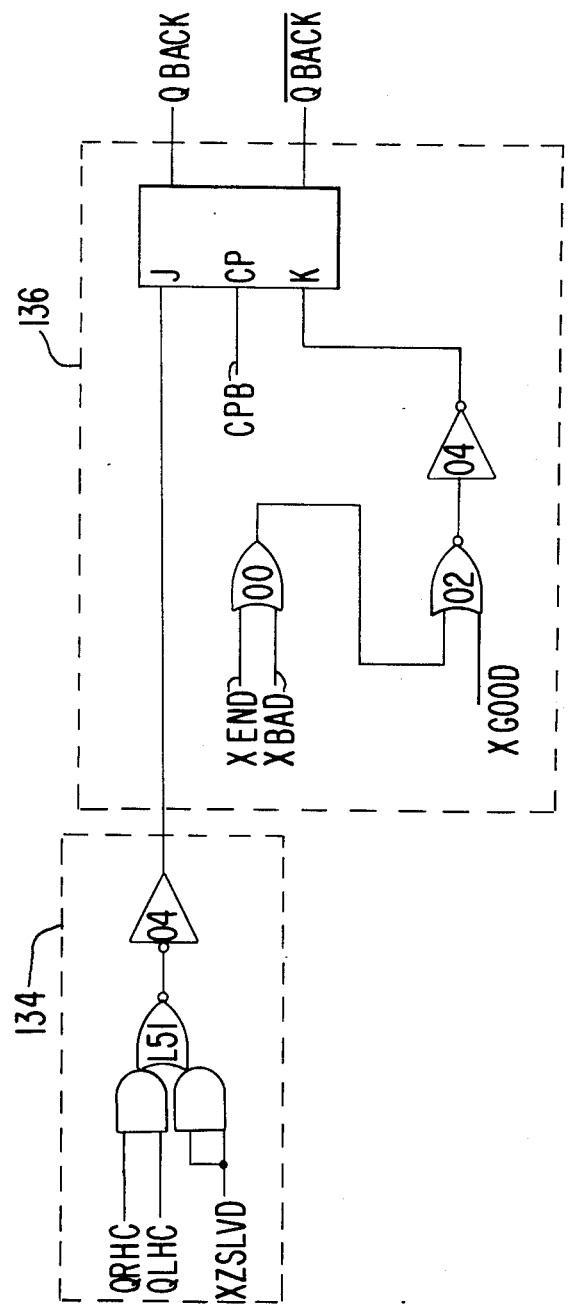

SYSTEM FOR DECODING BAR CODE

BACKGROUND OF THE INVENTION

The present invention relates to optical reader-scanner systems and, in particular, for improved means for processing data detected by a reader-scanner system.

Optical reader-scanner systems have achieved applications at automated supermarket check-out counters. A reader-scanner system operates as a data input system for electronic cash register systems and is used to read UPC (universal product code) symbols on the items.

The UPC symbol system was developed by the Universal Grocery Product Code Council, Inc., and is a bar code system which provides for binary coding of ten product identification decimal digits. The first five of these digits identify the producer of the item, and the last five identify the particular item of his product line. The actual symbol is comprised of about sixty parallel light and dark bars. Each of the ten digits used to identify the item is represented by a specific group of these bars and the actual encoding of the digit is obtained by variation in widths of bars making up this group.

In some cases, lesser numbers of digits are used and provisions have been made for utilizing greater numbers of digits for future codification. A complete description of the UPC symbol system may be found in a publication entitled "UPC Symbol Specification" dated May 1973 and published by Distribution Number Bank, 1725 K Street, N.W., Washington, D.C.

The reader-scan system contributes to the efficiency and convenience of the operation of automated check-out counters by allowing the UPC symbols to be read automatically as a package is manually transferred from the counter, across a scan pattern area or window.

In automatic electronic cash register systems, the data covering such things as pricing, quantity or coupon discounting and taxable or non-taxable nature of the item are stored in a memory bank of a controller console. The controller is programmed so that the address of this memory bank location corresponds to digital information encoded in the UPC symbol printed on the package of the item.

Typically, the scan pattern system uses a very low-powered laser, such as a helium-neon laser, to provide a coherent beam of monochromatic light. This type of light source provides the high level signal-to-noise ratio necessary for processing that is unavailable from other sources. The laser beam is then directed to a scanner mechanism which generates an optical scan pattern at a window in the check-out counter. An example of such an optical scan system is disclosed in copending patent application Ser. No. 568,633, filed Apr. 16, 1975, entitled "Optical Scan Pattern Generator" of James L. Hobart and Wayne S. Mefferd, and assigned to the assignee of the present application.

The actual identification of the symbol is made by electronically analyzing the signals generated by the laser light beam that is reflected back from the package surface to an optical detector. The output of the detector then goes to electronic circuitry and is continuously analyzed for the UPC symbol coded content.

When the high speed movement of the light beam crosses the light and dark bars of a UPC symbol, a specific pulse train waveform is generated. The characteristics of this waveform are established by the width of the individual light and dark bars and by the speed of the sweep. If the electronic circuitry determines that the symbol is valid and positive identification of the symbol is made, the signal is passed onto the controller of the cash register system. This output signal provides the address for the memory bank location where the instructions, for billing and cash register-receipt recording of that symbol, are stored.

If the symbol is not valid, i.e. has been tampered with, altered or damaged, the positive identification cannot be made, a no-reading visual or audio alarm is sounded. This notifies the clerk that a visual identification and a manual cash register entry must be made.

In scanner-reader systems presently available, the validation and identification of the stream of light and dark bars does not take place in real time. By this it is meant that the electronic processing circuitry does not analyze the data on a one-for-one basis as it is received. Rather, data which is believed to be valid data is routed to off-line registers or other storage devices, where the data is analyzed by the processor. Simultaneously, oncoming data which may be valid is routed to other registers. Data remains in a register until the processor determines that it is either valid or invalid.

Depending upon the optical scanner system used and the position of a label as it passes the scanner window, it is possible that only one or a few scans will intercept the label. When this happens, it is important that the data stream be correctly processed to determine the label information or else the label will not be read.

In the prior art system previously described, the storage registers frequently fill up with information which, although originally thought to be good information, turns out to be invalid. For example, the register may be filled with signals reflected from print on the container surface. If the processor takes a longer time to determine the contents of each register than it takes to fill up the registers, and if all the registers fill up with invalid data, then a for a given scan, good data which is subsequently provided as the beam sweeps the label is lost. In the case described above, where only one or a few scans intersect the label, this results in the label not being read at all.

The foregoing data processing system has other disadvantages. Processing time is relatively slow since the processing time does not take place in real time. Also, data is frequently stored long after sufficient information is available to determine that it is invalid. Also, this approach involves relatively expensive and complex electronic circuitry for its implementation.

SUMMARY OF THE INVENTION

In accordance with the present invention a system is provided for decoding coded character information where each encoded character comprises a plurality of bars of alternating light reflective characteristics of one or more widths which includes means responsive to bar width and character information to determine in real time valid sequences of the information.

More specifically, means are provided for establishing a multiple level decision-making sequence which includes means for comparing incoming bar width and characteristic information with bar width and characteristic values allowable at that level of the decision-making sequence for the bar and characteristic information sequence developed to that point, means for failing any information sequence which is not allowable, and means for moving to the next and subsequent levels of the decision-making sequence so long as the information sequence is an allowable one, until the completion of the multi-level sequence at which time an individual character is uniquely defined.

BRIEF DESCRIPTION OF THE DRAWINGS

FIG. 1 is a block diagram of the improved decoder of the subject invention utilizing a decision tree technique.

FIGS. 3A and 3B are a detailed graphical illustration of the digit tree starting with white shown in FIG. 1.

FIGS. 4A and 4B are graphical illustrations of the digit tree starting with black shown in FIG. 1.

FIG. 5 is a detailed graphical illustration of the edge guard bar tree and center pattern bar tree shown in FIG. 1.

FIGS. 8A, 8B, 8C and 8D are detailed schematics of the block schematic diagram of FIG. 7.

DESCRIPTION OF THE PREFERRED EMBODIMENTS

FIG. 1 is a block diagram of a decoder 10 for identifying information encoded in the form of a plurality of bars of alternating light reflective characteristics of one or more widths. For purposes of illustrating and describing the invention, the UPC code is hereafter used and described. However, the invention is equally applicable to other coding schemes and the invention is not limited to decoding UPC information.

Before explaining the operation of the decoder 10, a further description of the UPC is necessary. As explained above, for a complete description of this code, reference is made to the "UPC Symbol Specification."

Figure 2A:
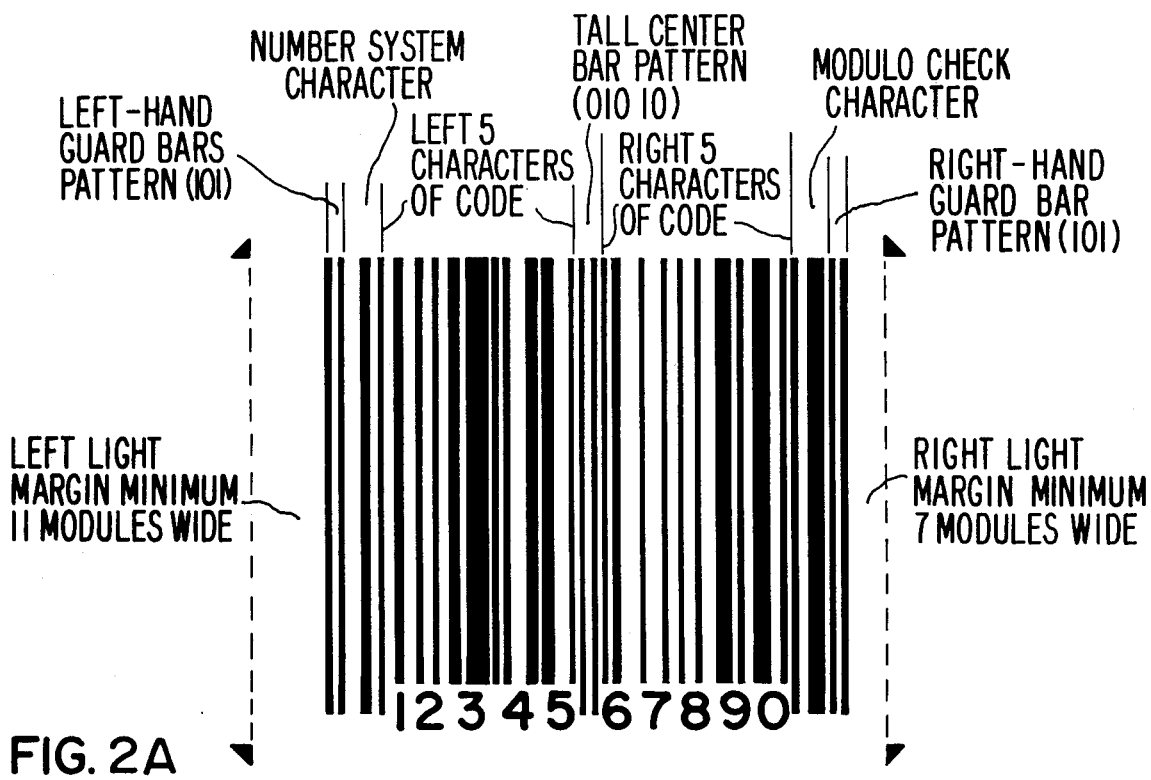
FIG. 2A is the UPC standard symbol.

FIG. 2A shows the UPC standard symbol. Among its characteristics are:

1. Overall rectangular shape, consisting of light and dark parallel bars (30 dark and 29 light for any 10-character code) with a light margin on each side. There are ten numeric characters.

2. Each character or digit of a code is represented by two dark bars and two light bars.

3. Each character is made up of seven data elements; a data element hereinafter is called a "module". A module may be dark or light.

Figure 2B:
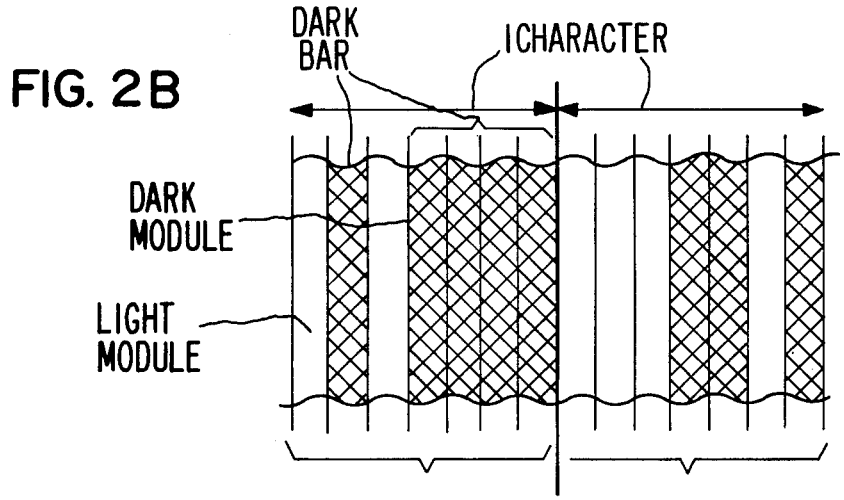
FIG. 2B is the UPC character structure for the characters shown in FIG. 2A.

4. A bar may be made up of 1, 2, 3 or 4 dark modules, as shown in FIG. 2B.

5. The symbol also includes two characters beyond the ten needed to encode the UPC;
   i. One character, a modulo check character, is embedded in the right-most position of the symbol to ensure a high level of reading reliability.
   ii. Another character, embedded in the left-most position of the symbol, shows which number system a particular symbol encodes.

6. Starting at the left side of the regular symbol following the light margin are edge or guard bars, followed by the number system character, followed by five UPC characters on the left side of the "center bar pattern", and then with the remaining five UPC characters on the right side of the center bar pattern, followed by the modulo-10 check character. Finally, the same guard bars are provided at the right side.

7. Dark modules represent 1's while light modules represent 0's. The number of dark modules per character on the left side is always 3 or 5 (i.e. odd) and the number is always 2 or 4 (i.e. even) for right-hand characters. This provides an "odd" and "even" parity encodation for each character.

8. Encoding is identical for all characters on a given side of the symbol, whether the character is part of the UPC number or is the number system character in the modulo check character.

9. The left and right guard bars are each encoded 101.

10. The center bar pattern is encoded 01010.

11. Encodation for the regular UPC characters (Version A) is given in the following table:

TABLE NO. 1

| Decimal Value | Left Characters | Right Characters |
|---|---|---|
| | (Odd Parity - O) | (Even Parity - E) |
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

For purposes of describing the invention, only the Regular Version, or Version A, and the Zero Suppression, or Version E, of the UPC are considered. Once again, however, the subject invention is applicable to all versions of the UPC.

The zero suppression version of the symbol is included to facilitate source symbol marking on packages that would otherwise be too small to include a symbol. This is achieved by encoding the symbol in a special way that leaves out some zeros that can occur in the UPC code. For example, code 56700-00089 can be encoded as 56789, effectively eliminating half of the area that would otherwise be required for the symbol. There is no explicit number system character for this version of the symbol.

The zero suppression label is similar to the portion of the regular UPC symbol, Version A, to the left of the center except for several items, including the following:

1. It has a right guard pattern which is coded 010101.

2. Three of the characters are coded in odd parity and three are in even. Character encodation for this version (E) only is given in the following table:

TABLE NO. 2

| Character Value | Odd Parity | Even Parity |
|---|---|---|
| 0 | 0001101 | 0100111 |
| 1 | 0011001 | 0110011 |
| 2 | 0010011 | 0011011 |
| 3 | 0111101 | 0100001 |
| 4 | 0100011 | 0011101 |
| 5 | 0110001 | 0111001 |
| 6 | 0101111 | 0000101 |
| 7 | 0111011 | 0010001 |
| 8 | 0110111 | 0001001 |
| 9 | 0001011 | 0010111 |

Note that the even parity encodation is different for Version E than that shown in Table I for the regular version.

3. As was pointed out above, the coding of the zero suppression version is compressed into six characters of varying parity. The determination of whether a character's parity is odd or even is per the following table:

TABLE NO. 3

ZERO SUPPRESSION - PARITY PATTERN

| Number System | Modulo Check Character Value | Character Location Number | | | | | |
|---|---|---|---|---|---|---|---|
| | | 1 | 2 | 3 | 4 | 5 | 6 |
| 0 | 0 | E | E | E | O | O | O |
| 0 | 1 | E | E | O | E | O | O |
| 0 | 2 | E | E | O | O | E | O |
| 0 | 3 | E | E | O | O | O | E |
| 0 | 4 | E | O | E | E | O | O |
| 0 | 5 | E | O | O | E | E | O |
| 0 | 6 | E | O | O | O | E | E |
| 0 | 7 | E | O | E | O | E | O |
| 0 | 8 | E | O | E | O | O | E |
| 0 | 9 | E | O | O | E | O | E |
| 1 | 0 | O | O | O | E | E | E |
| 1 | 1 | O | O | E | O | E | E |
| 1 | 2 | O | O | E | E | O | E |
| 1 | 3 | O | O | E | E | E | O |
| 1 | 4 | O | E | O | O | E | E |
| 1 | 5 | O | E | E | O | O | E |
| 1 | 6 | O | E | E | E | O | O |
| 1 | 7 | O | E | O | E | O | E |
| 1 | 8 | O | E | O | E | E | O |
| 1 | 9 | O | E | E | O | E | O |

There is, therefore, no explicit character encodation of the category or modulo check characters, their values are derived from the parity permutation of the six encoded characters. For further explanation, reference is made to page 17 of "UPC Symbol Specification" referred to above.

As set forth above, co-pending patent application entitled "Optical Scan Generator" by James L. Hobart et al, Ser. No. 568,633, as assigned to the same assignee as the subject invention, describes a system for optically scanning an item containing a UPC label with a laser beam as it passes over the scanning window. The subject matter of that patent application is incorporated herein by reference.

Referring to patent application Ser. No. 568,633, for any given laser beam scan of an item containing a UPC code, the reflected light beam and resulting electrical equivalent signal from the detector 58 may not provide useful information to decoder 10. This happens when the beam scans print on the product label, only a portion of the UPC symbol, etc. It is thus the job of decoder 10 to separate the valid UPC information from the useless information and to properly decode the valid data.

For operation of the decoder 10 of FIG. 1, it is first necessary to provide it with bar width (1, 2, 3 or 4 modules) or light and color characteristics (black or white) information which could be valid data. Whether it is or not is determined by the decoder 10 and subsequent processing circuitry.

A bar width measurer (BWM) 11 provides this information. It is the function of the BWM to examine the stream of video data from detector 58 representing the relative widths of the bars printed on the bar code label as it is scanned by the optical system. The length of time the digital video input signal remains in one logic state represents the width of one bar of one reflectivity. The absolute length of time the video signal remains in a given logic state is unimportant as long as it is within some rather crude limits. The information of interest is contained in the relative width of a bar with respect to the other bars in the label and, in particular, with respect to the basic unit of width, the module, upon which the bars are based.

There are a number of ways of accomplishing this function and presently in use in scanning equipment, all within the state of the art of those skilled in the art. See, for example, U.S. Pat. No. 3,723,710. Since the BWM 11 does not form a part of the subject invention, it will not be described in great detail, although the following brief description is given of one approach to the design of a BWM.

The BWM accepts the digital video from the optical scanning system and compares each bar to the basic unit of width upon which all the bars are based and determines how many of these basic units are contained in the bar being examined. It does so by pursuing a certain set of assumptions about which bars are contained by the boundary pattern and proceeding until it sees a bar that is either too big or too small to exist in the label if the basic assumption was correct. When it sees a bar such as this, i.e. out of range, it begins again with new assumptions. These assumptions are:

1. Too Large: If a bar that is too large is encountered, assume (a) it was a margin, and (b) the next bar is the beginning of a boundary pattern.

2. Too Small: If a bar that is too small is encountered, assume (a) it must be the first bar of a boundary pattern.

Thus, decoder 10 is fed a stream of signals from the BWM indicating bar sizes and color, which in relationship to each other may be valid. The decoder 10 must determine if the sequence of those bars constitutes a valid one or not. This includes distinguishing when only a part of a label has been scanned, but not enough to get a complete reading. The validation of one-half of a regular UPC symbol is considered a complete identification since the other half of the label can be read and validated by earlier or subsequent scans.

In order to determine the start of a valid half label, decoder 10 must identify either a left guard bar pattern, a right guard bar pattern, or a center bar pattern. The edge guard bar pattern tree 12 and the center pattern bar tree 14 accomplish this in a manner which will be described subsequently.

Assuming that a guard bar or center bar pattern has been identified, then the BWM information goes to either decision (or digit) tree 16 or 18. The former is applicable if the next bar is one which is white and the latter if it is dark.

Figure 3A:
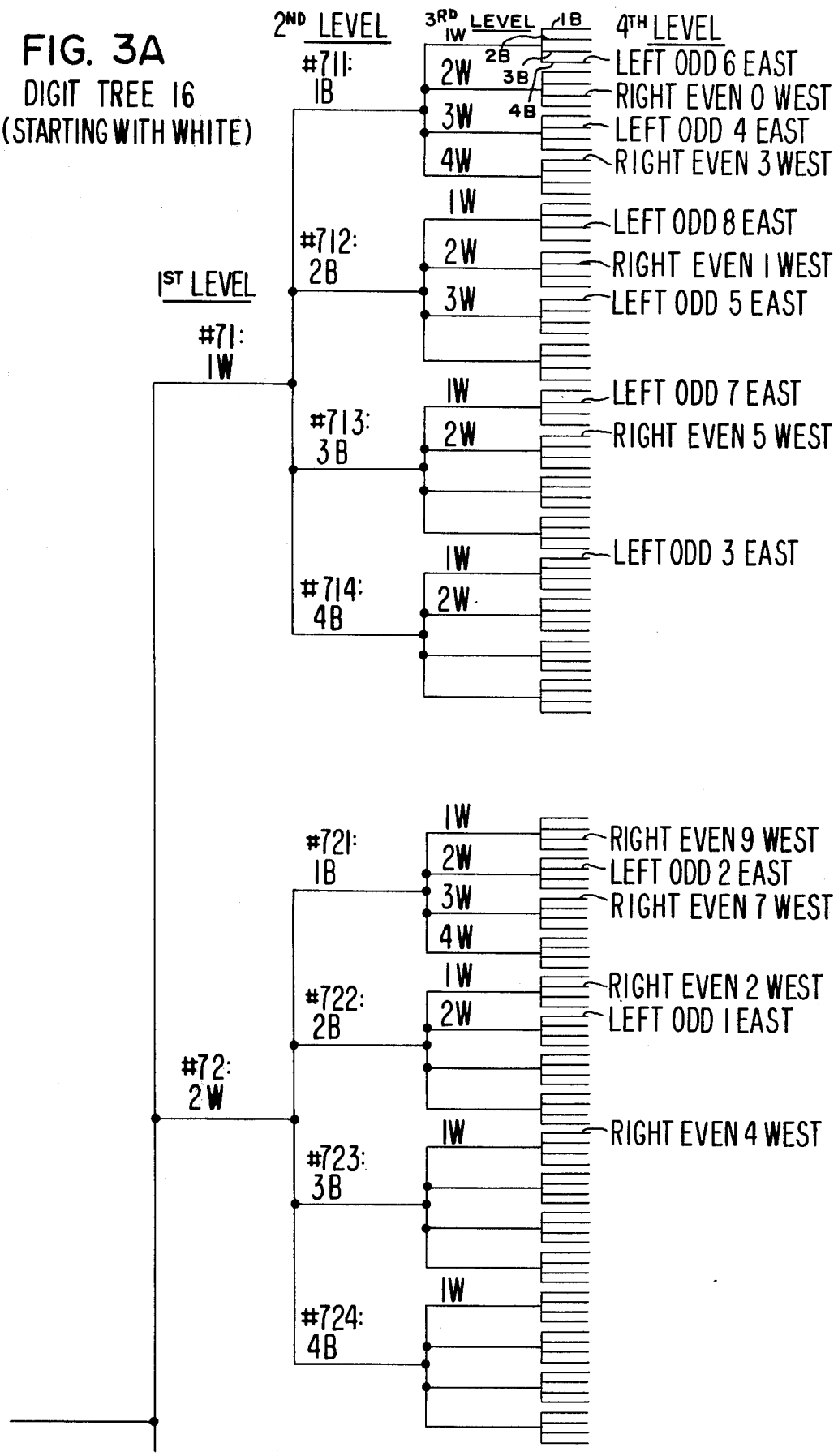

FIGS. 3A and 3B are graphical representations of decision tree 16 and FIGS. 4A and 4B of decision tree 18. Each tree 16 and 18 provides a four level decision making sequence. It has four levels because each character comprises four bars of from one to four modules in size. At each level a determination is made whether for the bar width sequence information provided, the sequence is a valid one, i.e. does it represent a valid sequence of 1's and 0's as set forth in Tables 1 and 2?. If it turns out to be valid, then the next BWM signal is looked at at the subsequent level of the decision tree. As long as the sequence is valid, the process continues through all the decision tree levels, i.e. four levels, and a valid character is decoded.

If at any time an invalid sequence is determined, decoder 10 is initialized and the search for a center bar pattern or an edge pattern begins again. If a valid character is decoded, the next BWM information is sent to the beginning of the same decision tree 16 or 18 and the decision tree procedure is followed again until it either culminates into the identification of another valid character or else it fails and the decoder 10 is initialized, and the search begins for another guard edge bar or center bar pattern.

There is one exception where the identification of an invalid sequence does not result in initialization of decoder 10. This occurs where the scan beam is sweeping past only a part of one side of the label and, without having scanned the entire side, passes over the center bar pattern. In that case, since the subsequent scan could result in a valid scan of the other half of the label, once decoder 10 realizes the number is invalid, but that this situation has occurred, it drops out of the decision tree 16 or 18 and into the appropriate level of the center pattern bar tree 14. Further explanation of this procedure will be given subsequently.

Figure 7:
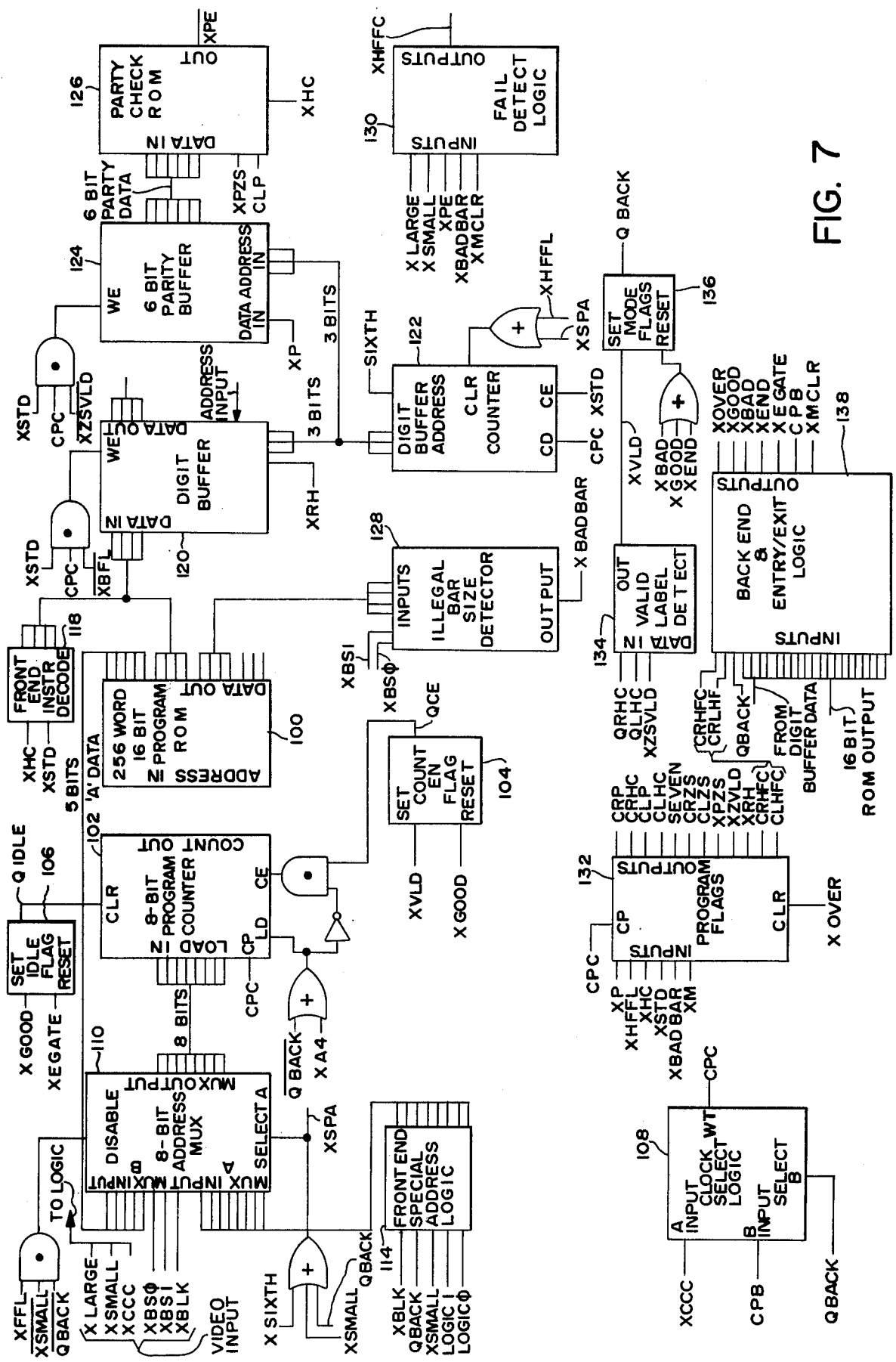
FIG. 7 is a block schematic diagram of one implementation of a decoder utilizing the decision tree technique of the subject invention for UPC applications.

Each validated digit is loaded into a buffer 120, which is shown in FIG. 7 and which will be described in greater detail subsequently. Once six digits representing one-half of a label are read and stored in the buffer, then the decoder 10 looks for either an edge pattern and white margin or a center bar pattern, depending upon the direction of the scan. If it finds either, it signals a valid one-half label complete. In the case of an edge pattern, since the scan can no longer be on the UPC symbol, the decoder is initialized, and it looks for the next edge guard pattern or center bar pattern. In the case of a center pattern, since there is the possibility of a scan of the remaining half label, the decoder goes back to decision tree 18, since the center bar pattern always ends with a white bar.

The operation of the digit trees 16 and 18 are best understood by providing several examples of their operation. Suppose that the first signal from the BWM 11 indicates a bar which is white and is one module wide. This is indicated by "1W" in FIG. 3A, at the first level of the decision tree, at reference #71. Since, of course, this is a valid first bar for quite a few digits, see Tables 1 and 2, the decoder progresses up to the second level of the tree. At this level of the tree, every size black bar, i.e. from 1B to 4B, is still a possible valid bar for the digits shown in Tables 1 and 2.

Let us suppose that the next bar is a black bar three modules wide, i.e. 3B. This corresponds to position #713 in FIG. 3A. At this next level, level 3, only a 1W or 2W bar constitutes a valid sequence. Thus, if the next input is either 3W or 4W, there is an invalid sequence and the decoder is initialized.

Assuming the next bar is 1W, then for there to be a valid digit, the next bar at the 4th level must be 2B, which gives the sequence 1W, 3B, 1W, 2B or 0111011. This corresponds to the digit 7, on the left side of the label, having odd parity, with the scanning beam going east. This can be confirmed by reference to Tables 1 and 2.

Should the last bar have been 1B, and hence invalid, the decoder 10 would not have initialized. This is because the scan could have been passing through a part of one side of the label and then, without scanning a complete half, have started into a center bar pattern or edge pattern. In the case of the former, it is thus possible that the remainder of the scan, across the other half of the label, will result in a valid half label scan. Accordingly, in the case of a 1B in this case, the decoder 10 automatically switches to the center bar tree at the first level.

Under the circumstances set forth in the previous paragraph, the decoder 10 switches to the center bar pattern tree. More specifically these circumstances are: whenever decoder 10 fails to progress further in tree 14 or 16 because the current BWM is invalid, and it is either a 1W or 1B, it shifts to the center bar pattern and, using the information previously acquired, it shifts into the appropriate place in the center bar pattern tree. The latter will be explained in greater detail in connection with the following explanation of the guard bar and center bar pattern trees 12 and 14 which are shown in greater detail in FIG. 5.

At the first, second or third levels of the edge tree 12, if a 1B-1W-1B sequence doesn't occur, then the tree is initialized, i.e. it starts back at the beginning of trees 12 and 14 looking for the start of an edge or center pattern. At the fourth level of edge tree 12, if the BWM is 2W, 3W or 4W, then the decoder switches to the first level of digit tree 16, indicated by the numbers 71-74 in FIGS. 3A and 3B, since the previous combination of bars indicates an edge guard pattern.

Should the bar at the fourth level be 1W, then the tree progresses to the fifth level since the scan may be either the start of a digit having 1W as its first bar or else the second bar of an edge pattern.

At level 5 of tree 12, if the BWM provides either a 2B, 3B or 4B, the decoder 10 switches again to the digit tree 16, but this time at its second level since it already has a 1W as the first level. This level is indicated as numbers 711-714. If the bar is 1B, it still could be the beginning of a character (having 1W, 1B as the first two bars) or it could be the fifth bar of a zero suppress label.

If the next bar is 1W, at the sixth level, then it knows, in fact, that it is a right edge of a zero suppress label since it has picked up a 1B-1W-1B-1W-1B-1W. A 2W, 3W or 4W puts it into digit tree 16 at the third level.

At the first and third levels of center pattern tree 14, if a 1W isn't present, it cannot be a center tree pattern and hence the tree initializes back to the edge tree 12 in anticipation of an edge bar. At the second and fourth levels of center tree 14, if no 1B is provided, then there cannot be a center tree and hence the decoder initializes, but back to the same tree in anticipation of a center pattern.

At the fifth level of center tree 14, if a 1W appears, a possible center pattern is determined and decoder 10 shifts over to funny tree 20, starting with black. Funny tree 20, shown in greater detail in FIG. 6, will be explained subsequently. If a 2W, 3W or 4W appears, then the decoder switches to digit tree 16, at the first level, since the three preceding bars, e.g. 1B, 1W, 1B, define an edge pattern.

Funny Tree 20

Whenever decoder 10 picks up what appears to be a center pattern, there is a potential ambiguity that the first two bars of the alleged center pattern actually are the last two bars of the character adjacent the center pattern. This can only happen in the case of the left hand digits 0 and 4 and right hand digits 4 and 6 since these are the only digits which end in bar 1W, 1B going toward the center pattern. See Table 1.

Recognizing this potential ambiguity, decoder 10, if it gets a single black or single white bar after a center pattern, goes to the funny decision tree 20. Funny tree 20 is the same as the regular digit trees 16 and 18 except that decoder 10 only stays in it so long as the first two bars of the characters are single black and single white, i.e. right 3's and 6's and left 0's and 4's. With this general rule stated, the following specific action is taken by the funny tree 20, referring additionally to FIG. 6.

1. If following 1B, 1W, either 2B, 3B or 4B follows, then decoder 10 knows that right 3's and 6's and left 0's and 4's are not being scanned and decoder 10 switches to the second level of digit tree 18 (FIG. 4A), numbers 812–814.

2. If decoder 10 keeps decoding any sequences of right 3's and 6's or left 0's and 4's, then decoder 10 stays in the funny tree throughout the six digit sequence and afterwards looks for the standard terminating edge pattern and large white space. In this situation, decoder 10 has seen a "real" center pattern.

3. If at any time, a 1B is not followed by 1W, and it is the beginning of a legitimate character sequence, a transfer is made to digit tree 18 at an appropriate level, i.e. the second level numbers 812–813. This is an indication that the center pattern was "real" and decoder 10 switches back into the regular tree.

Figure 6:
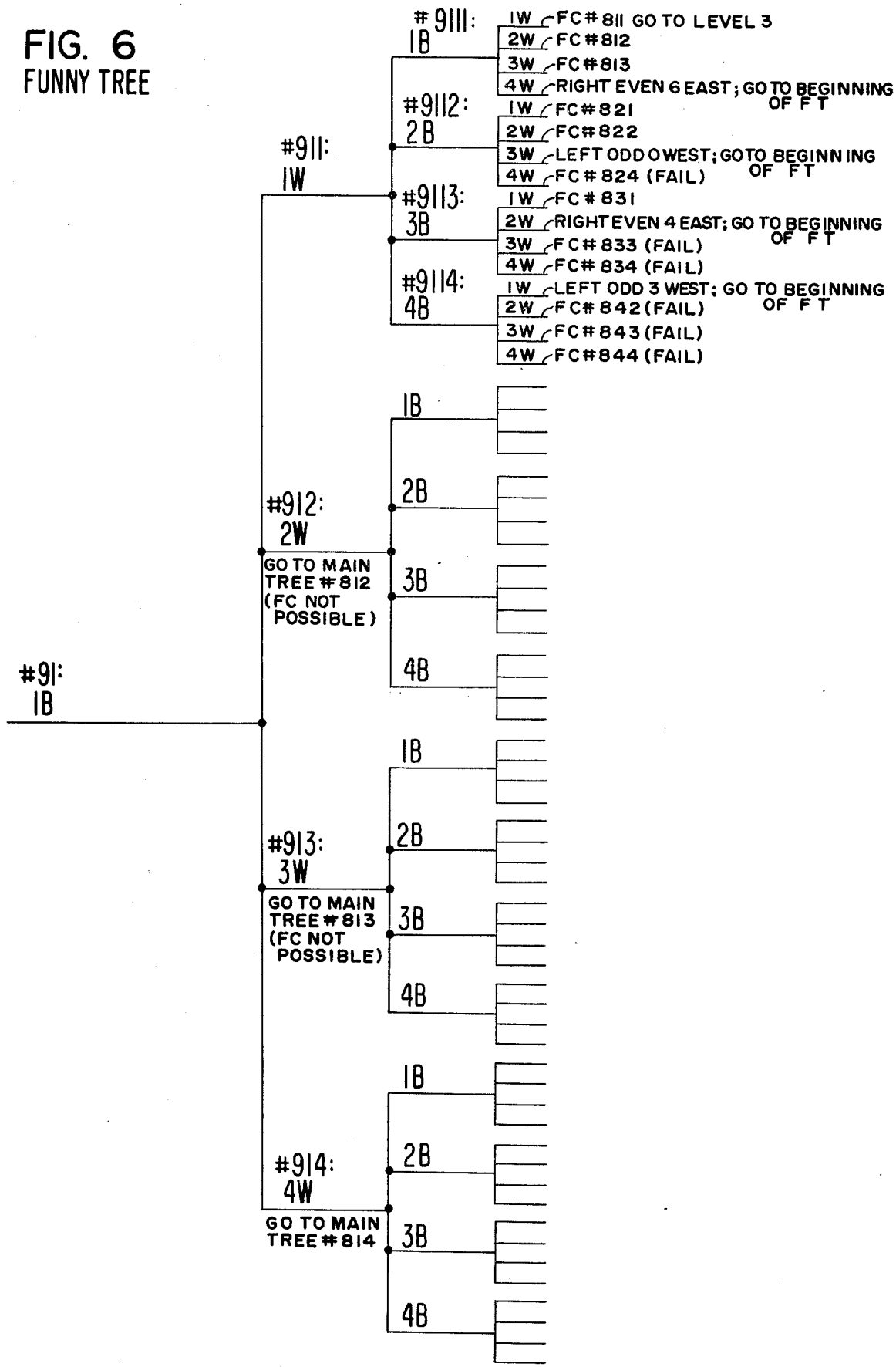
FIG. 6 is a detailed graphical illustration of the funny tree shown in FIG. 1.

4. If, following 1B, 1W, any of the following sequences occur, the decoder 10 goes to the third level of digit tree 18 as indicated in FIG. 6 and a funny convert takes place:

1B — 1W
1B — 2W
1B — 3W
2B — 1W
2B — 2W
2B — 3W
3B — 1W
3B — 3W
3B — 4W
4B — 2W
4B — 3W
4B — 4W

Figure 8B:
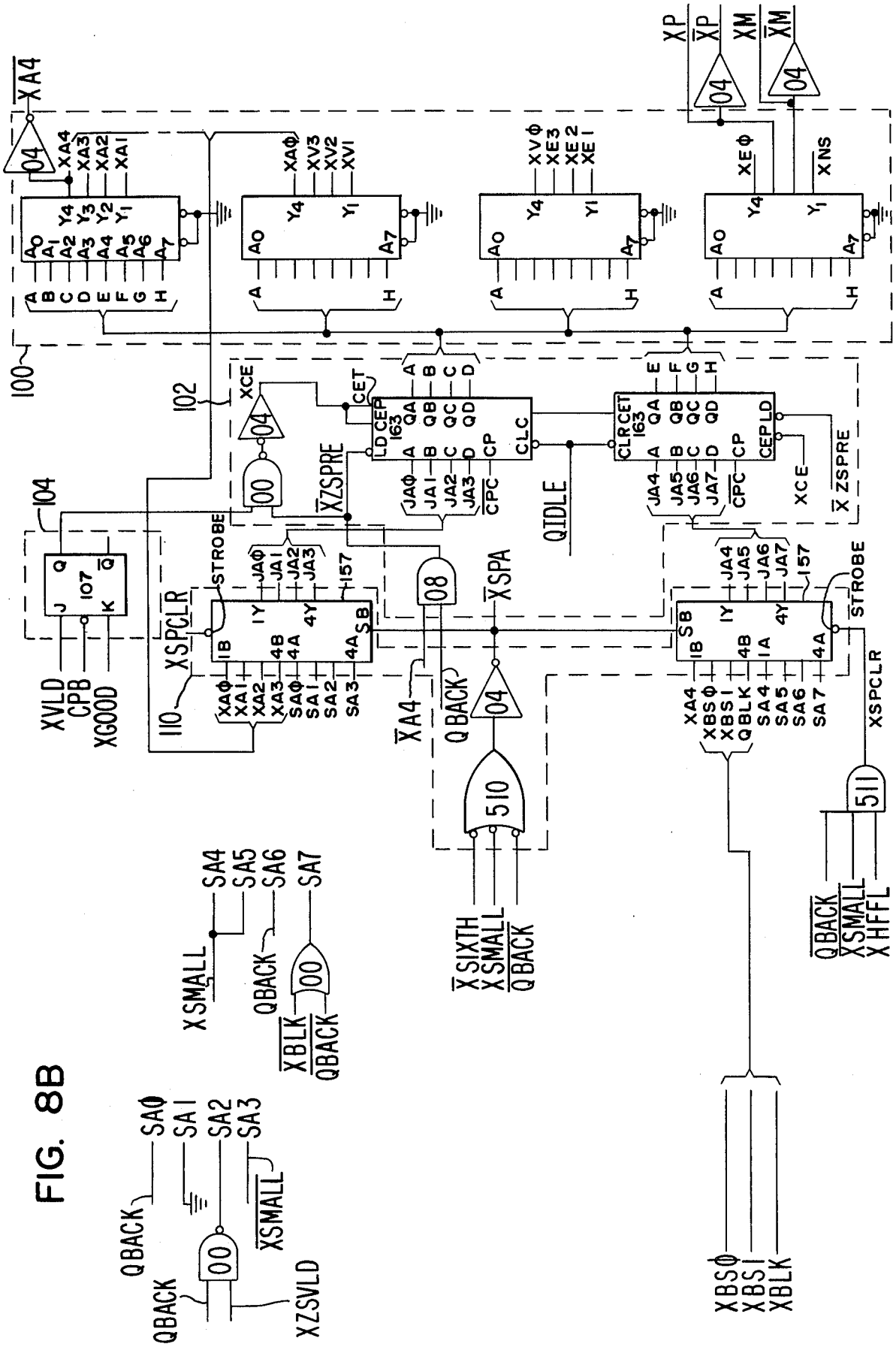
Figure 8C:
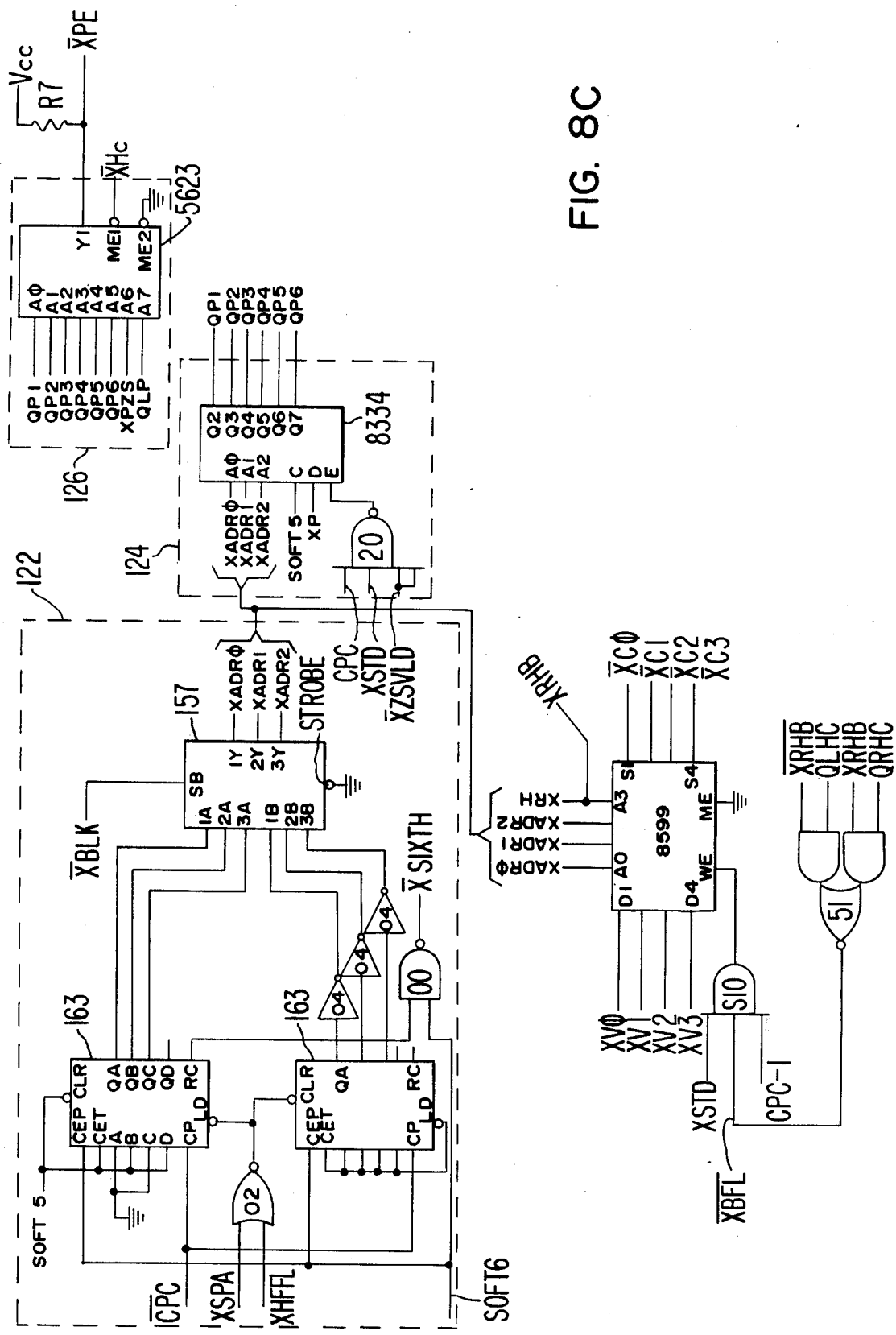
Figure 8D:
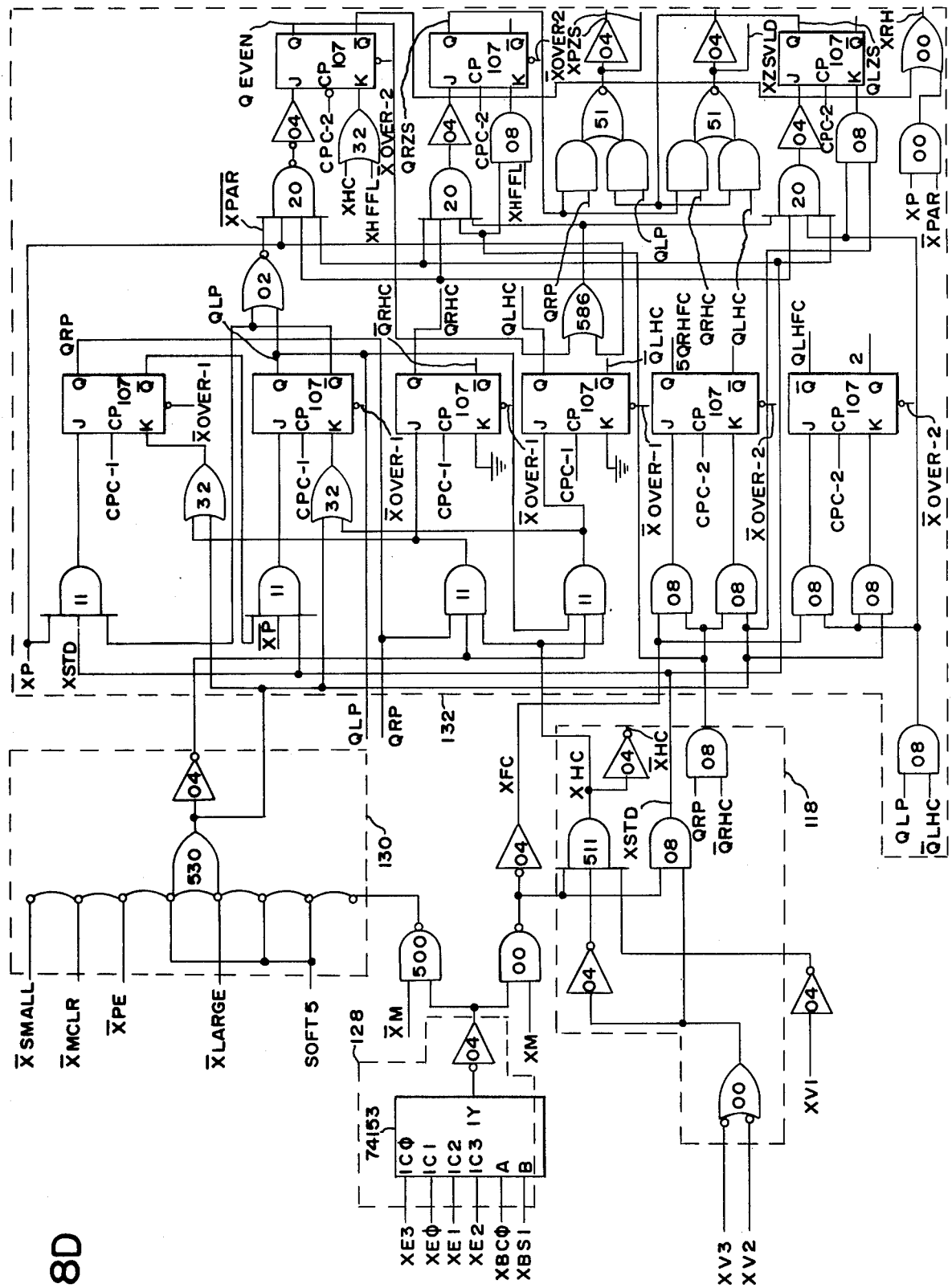

A funny convert indicates that the center pattern was not "real" and a conversion must take place to "shift" over two places. This is what takes place by shifting to the third level of digit tree 18. Further details of funny convert will be explained subsequently in connection with FIGS. 7 and 8A–8B.

5. If, following 1B, 1W, any of the following sequences occur, then the decoder 10 remains in the decision tree:

1B — 4W
2B — 3W
3B — 2W
4B — 1W

One example of the implementation of the decision tree technique of decoder 10 which has been described above is now given. Reference is made to FIG. 7 which is a block schematic diagram of decoder 10 and to FIGS. 8A–8D which are detailed schematics of the block diagram of FIG. 7.

The heart of the decoder 10 is the program ROM 100 which contains 256, 16-bit instructions that direct the functioning of decoder 10. Included in these instructions are Front End and Back End instructions. The Back End instructions process the information acquired by the Front End operation to perform the "checksum check" (see "UPC Symbol Specification" referred to above) and outputting of decoded data. The Back End instructions are not pertinent to an understanding of the subject invention and will not be described in detail.

The Front End instructions constitute the various decision trees which have been described above. Henceforth these trees will be referred to collectively as "tree". These instructions derive their information from current data relating to bar size and color and past history consisting of 5 bits from the previous 16 bit instruction. Thus, program action consists of examining each piece of information as it comes in and making decisions for action immediately, rather than storing a large volume of data and then looking at all of the individual pieces of information to decide if any group of data is valid. This function of processing data from UPC labels in real time, i.e. examining data as it appears, is a major and unique feature of decoder 10.

Each new piece of data is used by the Front End instructions to update the program position in the tree. The program position in the tree determines whether the instruction output causes the program to continue looking at incoming data or causes the program to jump back to the beginning of the tree. The jump back to the beginning of the tree will be caused by a new piece of data trying to force the program to an illegal branch of the tree or by having acquired enough valid data to constitute a complete set of data, i.e. a valid half label.

Since the program ROM, block 100, contains both Front End and Back End instruction as explained and they will never both be used simultaneously, ROM output requirements can be cut in half by making duplicate use of the output bits. In the Front End, the bits have one meaning and in the Back End, another. The logic distinguishes between these two states by referencing all interpretation of the output bits to QBACK, block 136. If flag (flip-flop) QBACK is reset, Front End operation is indicated. IF QBACK is set, Back End operation is indicated. The meaning of the bits in Back End operation is not discussed, as it is not necessary for an understanding of the subject invention.

The breakdown of the 16-bit instruction word is given below for 'Front End' operation only:

| ROM OUTPUT BITS | DESIGNATION FOR THE BITS | FUNCTION |
|---|---|---|
| 11–15 | XA0–XA4 | Address bits ('A' bits) |
| 7–10 | XV0–XV3 | Value bits ('V' bits) |
| 3–6 | XE0–XE3 | Expected bar size data ('E' bits) |
| 2 | XP | Parity bit |
| 1 | XM | Funny convert enable |
| | φXNS | Inhibit Update |

The 'A' bits help to determine the next program address for the program ROM, block 100. Three bits of UPC label video, XBLK, XBS0, and XBS1 combine with the five 'A' bits to specify the next 8-bit address as will be explained in greater detail subsequently.

The 'V' bits specify Front End instructions as shown in the table below:

*TABLE NO. 4

| VALUE OF V BITS | | | | |
|---|---|---|---|---|
| XV3 | XV2 | XV1 | XV0 | FRONT END INSTRUCTION |
| 0 | 0 | 0 | 0 | Load a '0' into the digit buffer block 120 |
| 0 | 0 | 0 | 1 | Load a '1' into the digit buffer block 120 |
| 0 | 0 | 1 | 0 | Load a '2' into the digit buffer block 120 |
| 0 | 0 | 1 | 1 | Load a '3' into the digit buffer block 120 |
| 0 | 1 | 0 | 0 | Load a '4' into the digit buffer block 120 |
| 0 | 1 | 0 | 1 | Load a '5' into the digit buffer block 120 |
| 0 | 1 | 1 | 0 | Load a '6' into the digit buffer block 120 |
| 0 | 1 | 1 | 1 | Load a '7' into the digit buffer block 120 |

*TABLE NO. 4-continued

| VALUE OF V BITS | | | | |
|---|---|---|---|---|
| XV3 | XV2 | XV1 | XV0 | FRONT END INSTRUCTION |
| 1 | 0 | 0 | 0 | Load a '8' into the digit buffer block 120 |
| 1 | 0 | 0 | 1 | Load a '9' into the digit buffer block 120 |
| 1 | 0 | 1 | 0 | Load a 'A' into the digit buffer block 120 |
| 1 | 0 | 1 | 1 | Load a 'B' into the digit buffer block 120 |
| 1 | 1 | 0 | 0 | XHC - Half Complete |
| 1 | 1 | 0 | 1 | XHC - Half Complete |
| 1 | 1 | 1 | 0 | Not Used |
| 1 | 1 | 1 | 1 | NOP Instruction (No Operation) |

*Notes
1. The command XSTD is generated for the first twelve 'V'commands. This is what actually causes the appropriate number to be loaded into the digit buffer, block 120.
2. All data is represented in hexadecimal.
3. The 'A' or 'B' hexadecimal are loaded for the Funny Convert situation only.

The 'E' bits are used by the program to specify the next allowable bar size. The program knows, from where it is currently in the tree, what the allowable bar sizes are for the next data coming in, as will be explained by way of example subsequently. This data is fed into the illegal bar size detector 128, with the current bar size, to indicate good or bad bar size data from bar width measure. See the table below for 'E' data coding:

TABLE NO. 5

| E DATA | | | | |
|---|---|---|---|---|
| XE3 | XE2 | XE1 | XE0 | ALLOWABLE BAR SIZES |
| 0 | 0 | 0 | 0 | Not Defined |
| 0 | 0 | 0 | 1 | 1 |
| 0 | 0 | 1 | 0 | 2 |
| 0 | 0 | 1 | 1 | 1,2 |
| 0 | 1 | 0 | 0 | 3 |
| 0 | 1 | 0 | 1 | 1,3 |
| 0 | 1 | 1 | 0 | 2,3 |
| 0 | 1 | 1 | 1 | 1,2,3 |
| 1 | 0 | 0 | 0 | 4 |
| 1 | 0 | 0 | 1 | 1,4 |
| 1 | 0 | 1 | 0 | 2,4 |
| 1 | 0 | 1 | 1 | 1,2,4 |
| 1 | 1 | 0 | 0 | 3,4 |
| 1 | 1 | 0 | 1 | 1,3,4 |
| 1 | 1 | 1 | 0 | 2,3,4 |
| 1 | 1 | 1 | 1 | 1,2,3,4 |

The parity bit, XP, specifies the parity of the black modules in the UPC label digit being loaded into the digit buffer 120. The parity for each digit in the digit buffer 120 is stored in the parity buffer 124. The parity is stored only for one label half at a time. See "UPC Symbol Specification" referred to above for more information concerning parity of the black modules.

The funny convert enable bit, XM, enables the funny convert flags 132, QRHFC and QLHFC, so they are set if conditions indicate they should. The inhibit update bit, XNS, inhibits the updating function of the Bar Width Measurer if XNS is true.

Each branch in the tree actually consists of a particular 8-bit address at the input of the program ROM 100. The program counter 102 applies this 8-bit address. The program counter operates in two modes: the "load" and the "count" modes. In the load mode, the data at the input to the counter 102 appears at the counter outputs following the rising edge of the counter clock signal.

In the count mode, the counter output increments by 1 following the rising edge of the counter clock signal. The counter is in the load mode during the Front End and is in the count mode during the Back End. This is because during the Front End, the program ROM 100 must be free to instruct a jump in address, corresponding to a branch in the tree. This means that not all addresses are consecutive and therefore the program counter 102 does not have a sequential output. Thus, it must be in the load mode, where its output follows the input and not a sequential counting scheme.

The program counter 102 is in the load mode when QBACK or XA4 is true. The term QBACK is a flag (flip-flop output) designating Back End operation when set, Front End operation when reset. XA4 has no effect on the load input to the program counter 102 during the Front End because QBACK is reset. XA4 affects the load function of the program counter 102 only during Back End operation.

The count enable input of the program counter 102 is true if the load term is false and QCE 104 is set. The flag QCE is set when a valid set of data has been acquired (XVLD is true) and is set only for Back End operation, so its function is not pertinent.

The clear input of the program counter 102 is activated only if QIDLE, block 106, is set. The flag QIDLE is controlled by Back End and Entry/Exit logic, so its function does not relate to the subject invention except that it starts the program counter, block 102, always at 00 (hexadecimal). This assures that the program ROM 100 always has a fixed starting address (tree location) for the program.

The program counter 102 clock input comes from the clock select logic 108. During Front End operation, the clock output is XCCC, the color change clock that is part of the UPC label video information from the Bar Width Measurer 11. Thus, the program counter 102 does nothing and the program ROM 100 instruction output bits do not change, until a new piece of video data is sent from the Bar Width Measurer. In Back End operation, data acquisition has halted and the data that is currently stored needs to be processed for a "checksum check". Therefore, an internal Back End clock, CPB, is selected to clock the program counter 102 so the appropriate processing can take place by sequencing the program ROM 100 address inputs.

The program counter 102 load inputs come from the 8-bit address multiplexor, Mux 110. Normally, the 'B' inputs of the Mux are selected, meaning that the 8-bit program counter 102 inputs consist of the 'A' bit outputs from the program ROM 100, and three bits of video data from the Bar Width Measurer, XBS0, XBS1, XBLK.

If the disable input on the address Mux 110 is high, all outputs of the Mux become a logic 0. This causes the program counter, block 102, to load a 00H (00hexadecimal), forcing the program back to address 00H. The disable is high if XHFFL is true, XSMALL is false, and QBACK is false. In the Front End operation QBACK is always false. The XSMALL term is an error signal from the Bar Width Measurer, indicating that it has discovered some bad data and this term is normally false. Later explanation covers the case where it is true. The term XHFFL is the output of fail detect logic, block 130. Any of four types of failure or a masterclear signal causes XHFFL to become true.

If XSIXTH, XSMALL or QBACK is true, address Mux 110 'A' inputs are selected. The flat QBACK true indicates Back End operation. The signal XSMALL is an error signal sent to the decoder 10 by the Bar Width Measurer and indicates bad video data. The signal XSIXTH is an output of the digit buffer address counter 122 and indicates that six valid digits from a UPC label have been stored. This indicates either a partial or complete UPC label has been acquired, depending upon the status of the program flag 132 outputs.

Any of the three signals described in the preceding paragraph require special action on the part of the program. Therefore, the 'A' inputs of the address Mux 110 are selected for the program counter 102 load inputs. This connects the output of the Front End special address logic 114 to the program counter 102 load inputs.

This means that the load inputs for the program counter 102 and consequently the next address for the program ROM 100 are determined by the front end special address logic 114. The inputs to the front end special address logic are XBLK, XSMALL, and QBACK. For Front End operation, QBACK is false all the time, so the variable inputs to the front end special address logic 114 are only XBLK and XSMALL, both signals from the Bar Width Measurer.

Summarizing operation of the address logic for the program in the Front End (QBACK is always false), the following simple operation becomes apparent:

TABLE NO. 6

| XHFFL | XSIXTH | XSMALL | NEXT PROGRAM ADDRESS |
|---|---|---|---|
| 0 | 0 | 0 | 5 bits of ROM instruction output (XA0-XA4) and 3 bits of video data, XBS0, XBS1, XBLK |
| X | 0 | 1 | one of two 8-bit addresses depending on what XBLK (color) is |
| 0 | 1 | 0 | one of two 8-bit addresses depending on what XBLK (color) is |
| X | 1 | 1 | Not possible |
| 1 | X | 0 | 00H (hexadecimal) |

Notes:
1. A '0' denotes A logic false condition.
   A '1' denotes A logic true condition.
2. An 'X' denotes either a '0' or a '1' and will cause the same address action in either case.

The front end instruction decode logic 118 looks at the 'V' data and if appropriate, generates a 'store digit' (XSTD) signal or a 'half complete' (XHC) signal. As was shown in Table No. 4, XSTD occurs for 'V' data of 0H–9H (0–9 hexadecimal).

The 'V' data is also the data input for the digit buffer 120. The write enable for the digit buffer is XSTD, XCCC, and $\overline{XBFL}$. The signal XBFL indicates that the digit buffer is full. If the buffer is full, no more data can be written into it. When a store digit command (XSTD) is given, the color change clock (XCCC) will write the 'V' data into the buffer if the buffer is not full ($\overline{XBFL}$). Note that since 'V' data 0H–BH (0–B hex) causes the front end instruction decode 118 to generate a store digit command (XSTD), and that the same 'V' data 0H–BH is present at the digit buffer 120 data inputs, 'V' data 0H–BH is equivalent to 'Load digit 0H–BH specified by 'V' data into the digit buffer'. That is, 'V' data of 3H means "Load 3H into the digit buffer".

If 'V' data were AH, a AH digit would be loaded in to the digit buffer 120. Thus, when the program is at a point in the tree where it knows that the last piece of UPC video data it saw was the last bar of a valid character, the program puts the hexadecimal value of that character of the 'V' data outputs of the program ROM 100, causing the value of that character to be loaded into the digit buffer 120. The data output from the digit buffer goes to the Back End logic.

For Front End operation, the digit buffer address consists of the digit buffer address counter 122, and a signal XRH. This specifies where in the buffer the digits are stored. It is necessary to store data in fixed locations in the digit buffer so during Back End operation, the Back End logic always calls out data from the digit buffer in the correct order that it appears on the UPC label code. The signal XRH specifies which half of the digit buffer the data is stored in and the 3-bit digit buffer address counter 122 specifies the particular location within the half.

The digit buffer address counter 122 is incremented with each store digit command, XSTD. The next location in the half of the digit buffer being loaded is selected each time a digit is loaded into the digit buffer. The clock for the buffer address counter is the same as for the program counter 102, CPC.

During Front End operation, CPC is the color change clock XCCC. The digit buffer address counter is cleared by XHFFL 130, or XSPA, block 110. The signal XSPA is XSIXTH, or XSMALL, or QBACK. During the operation of the tree, the digit buffer address counter is cleared by the error signal XSMALL from the Bar Width Measurer Unit, or XSIXTH, one of the digit buffer address counter, block 122, outputs indicating a complete label half (6 digits) has been loaded in the digit buffer, or by XHFFL, indicating some error in label data being acquired.

In each of these cases, the data in the digit buffer 120 is not cleared, but the buffer address is moved back to its starting location so that new data is written over the data that was written in error. In the case where a complete label half of data was completed, the digit buffer address counter being cleared does not cause new data to be written over the old because the XRH signal that is one of the digit buffer address inputs changes state so that new data is written into the beginning location of the other half of the digit buffer.

The digit buffer address counter 122 also provides the address input for the parity buffer 124. This buffer provides the same function as the digit buffer, except it stores the black module parity of the digit being stored in the digit buffer.

The data input for this buffer is the program ROM 100, output of XP. The condition for writing into the parity buffer is that if no valid zero suppress label has been read (XZSVLD) and a store digit command has been given, write the parity, XP, on the color change clock, XCCC.

The parity check ROM 126 performs this check of the parity pattern. For a regular (Version A) UPC label (12 digits) the black module parity of all six digits in a half is the same, but the parity of left half digits is opposite the parity of right half digits. In the UPC zero suppress label, there are only six digits in the label and it is not possible to read only half the label successfully. Therefore, there are no left and right label halves as with the expanded UPC label. In the zero suppress label, the parity of all six digits is not the same. See Table 3.

This parity pattern of odd-even-even-odd, etc. can be only one of twenty different combinations. If all combinations were allowed, there would be sixty-four combinations. The parity check ROM 126 has as inputs XPZS, which indicates a zero suppress label, and QLP, which indicates, for a Regular Version, which half of the label is currently being tested for parity. The parity check ROM is normally disabled, so its output has no effect. When the program generates the XHC (half complete) command 118, the parity check ROM 126 is enabled during the command, so its output is active. If any parity discrepancy exists, the output XPE, for a parity error, comes up.

Another error detecting circuit is the illegal bar size detector 128. As was mentioned above, the 'E' data out of the ROM 100 gives the allowable bar sizes for the next bar seen by the video and measured by the bar size measurer. The expected bar size ('E' data) is matched against the bar size (XBS0,XBS1) and if a discrepancy exists, the XBADBAR signal goes up.

The fail detect logic 130 indicates a failure to acquire a label half (XHFFL) if XPE or XBADBAR occur, or if the Bar Size Measurer detects a bar size discrepancy with a bar suddenly far too large or small compared to the bars it had been measuring (XLARGE, XSMALL), or if a master clear occurs (usually only on powering up).

The program flags, block 132, are flip-flops that indicate the status of the decoder 10 as it is attempting to read a UPC label. The flags are used by the rest of the decoder 10 logic to indicate action that has been taken and the action that still needs to be taken in order to acquire a complete valid UPC label.

All the flags are clocked by CPC, the same clock that clocks the program counter 102, so that during Front End operation, they are clocked by XCCC, the color change clock. They are set and reset by the signal inputs depending on the state of these, but they are all cleared by XOVER, a signal generated by the Back End and Entry/Exit Logic 138. This signal occurs as the operator, who is moving a UPC label through the scan target or window area, causes the label to leave the scan target area. As the decoder 10 senses that the label has left the scanning area, it resets all the program flags to be ready to start from scratch on the next label that enters the scan target area.

The flags QRP and QLP are the "right partial" and "left partial" flags, respectively. These are set as soon as the first valid UPC label digit is read and stored by a store digit (XSTD) command. One or the other is set, depending upon the parity (XP) of the first digit. As was mentioned earlier, in the explanation of the parity ROM 126, for an expanded label, the parity of all the digits are the same and the parity of the right half digits is opposite the left half.

The program starts off assuming a Regular Version UPC label is being read and sets either QRP or QLP, as XP indicates. At the same time, the flag QEVEN is set or not and then its inputs are locked out until a complete label half has been acquired or the flags have been reset by a fail condition.

The flag QEVEN stores the parity of the first digit in the half label currently being acquired for use as reference later on, as will soon be explained. For a Regular Version label, the flags stay in the state they are in during the remainder of the acquisition of the half if no fail condition occurs, as designated by XHFFL, block 130, or by XOVER which indicates the Back End functions are complete and the label is out of the acquisition area. During the half acquisition, XRH tells the digit buffer 120 which half of the label is currently being acquired and thus, which half of the digit buffer to store the digits in. When the sixth digit is stored, XSIXTH occurs and is detected by the program.

The program generates the half complete command, XHC, block 118, and the parity check ROM 126 is enabled. The parity ROM 126 checks the status of QLP to check parity. If QLP is not set, QRP is assumed to be set. The half complete command, XHC, also enables either QRHC or QLHC (right or left half complete) flags to be set, and the one set will depend on whether QRP or QLP respectively are set when XHC occurs. If at this time a parity error (XPE is true) occurs, then the flags are all reset and the program starts looking for another half label from scratch. If no parity error occurs, QRHC or QLHC are set and the program accepts only label halves of the missing variety (i.e. left halves if QRHC is set, or right halves, if QLHC is set). This is true until XOVER happens, at which point all flags are reset.

For zero suppress labels, the flag operation is similar, but additional flags are required. The flags QRP, QLP and QEVEN are set as described above, depending on the parity of the first digit stored. As was stated above, the program makes the assumption that one half of the UPC Regular Version label is being acquired at this point. If, however, the parity of one of the six digits being acquired changes from what the parity of the first digit was (QEVEN), it is realized that a zero suppress label is being acquired. Therefore, QRZS or QLZS (right or left zero suppress) is set, depending on whether QRP or QLP, respectively, are set. The terminology "right" or "left" zero suppress does not imply that there are two zero suppress label halves. It just indicates what the parity of the first digit was and, therefore, which half of the digit buffer 120 the zero suppress label is being stored in.

As soon as QRZS or QLZS is set, the indicator XPZS comes up, indicating a "partial zero suppress" label has been acquired and the rest of it is still to be acquired. This flag output, XPZS, is one of the inputs to the parity ROM 126, and indicates that when the command "half complete", XHC, is given, the parity ROM must check the parity pattern of the six digits to see that it agrees with one of the accepted patterns. The half complete command, XHC, also sets QRHC or QLHC as was described above. At this point, the flag output XZSVLD (zero suppress valid) comes up if QRHC and QRZS or QLHC and QLZS are true.

The two remaining flags, QRHFC and QLHFC (right or left half funny convert) are set from the input XBADBAR and XM. Under conditions described above, the program gets out of step with the incoming data so that it is looking at part of one UPC character and part of another, yet it thinks it is looking at all of one character. As explained previously, there are some digits that are encoded in such a manner that by taking part of one digit's code and placing it with part of another digit's code, a valid digit code, being neither of the two digits involved, is seen by the program. As was explained earlier (see UPC label and funny convert explanation), there are only four digits that can be involved in a funny convert situation. These digits are '0', '4', '3', and '6'. At times a '0' can look like a '4' and vice versa. Similarly, a '3' can look like a '6' and vice versa. When this condition exists, the program realizes it, but at this point does not have enough information to tell what it is actually seeing, so it writes either an 'A' or 'B' hexadecimal into the digit buffer. The 'A' will be converted (funny convert) to a '0' or '4' by the Back End logic and the 'B' will be converted to a '3' or '6'. This conversion will be explained shortly.

As soon as the program comes to two digits that do not yield a valid code, the signal XBADBAR occurs, because the program was expecting a certain bar size and did not see it. At this point, the logic normally generates a fail condition indication, XHFFL, block 130. The program can recognize that it was in this type of situation usually, so when the XBADBAR signal occurs, it gives the XM command that inhibits XHFFL and sets one of the funny convert flags, QRHFC or QLHFC, if conditions warrant it.

The funny convert flags are used by the Back End logic 138 to convert the 'A' or 'B' stored in the digit buffer 120 to the proper number.

Funny Convert Explanation

This is done by a ROM in the Back End logic which will convert an 'A' hexadecimal number stored in the digit buffer 120 to a '0' or '4', as the digits are being moved out of the digit buffer in the Back End operation. A 'B' hexadecimal number will be converted to a '3' or '6'. Digits '0' through '9', including '0', '4', '3', and '6' are uneffected by the funny convert operation of the ROM. They are moved out of the digit buffer 120 in the same form as they are stored. The conversion that takes place depends upon the state of the funny convert flags, QRHFC and QLHFC, and the half of the UPC label that the digit 'A' or 'B' was from. A digit is said to be stored in the "left half" of the digit buffer if the digit was part of the left half of a UPC label or in the "right half" of the buffer if the digit was from the right half portion of a UPC label. Digits are always stored in fixed locations depending on which half of the label they are in (see digit buffer 120 explanation) so the Back End logic always knows which half of a UPC label a digit was from by its location in the digit buffer. The following table will define these relationships as they apply to the funny convert operation:

TABLE NO. 7

| Digit Being Converted | Buffer Half Digit Stored In | QLHFC | ORHFC | Converted Digit |
|---|---|---|---|---|
| A | Left | 0 | 0 | '0' |
| A | Left | 0 | 1 | '0' |
| A | Left | 1 | 0 | '4' |
| A | Left | 1 | 1 | '4' |
| A | Right | 0 | 0 | '4' |
| A | Right | 0 | 1 | '0' |
| A | Right | 1 | 0 | '4' |
| A | Right | 1 | 1 | '0' |
| B | Left | 0 | 0 | '3' |
| B | Left | 0 | 1 | '3' |
| B | Left | 1 | 0 | '6' |
| B | Left | 1 | 1 | '6' |
| B | Right | 0 | 0 | '6' |
| B | Right | 0 | 1 | '3' |
| B | Right | 1 | 0 | '6' |
| B | Right | 1 | 1 | '3' |

Note:
A '0' or '1' value in the QLHFC and QRHFC columns denotes a logic state, false or true, respectively.

The valid label detect logic 134 generates the signal XVLD (valid label acquired) that sets QBACK and puts the processor unit in the Back End mode. The flags QRHC and QLHC or XZSVLD cause the XVLD signal to go high.

The flag QBACK, block 136, determines whether the decoder 10 is in the Front End or Back End mode. That is, whether the decoder 10 is acquiring (reading) a UPC label (Front End operation) or it is processing stored UPC label digits (Back End operation). If QBACK is true, it indicates Back End operation. The flag QBACK is set by XVLD and reset by one of several Back End logic 138 signals.

The Back End function is to check the checksum according to the modulo 10 algorithm defined by the UPC specifications. The Back End is entered after the Front End has fully decoded a label known to be valid in every way except for the checksum. The Back End then performs the modulo 10 calculations and checks for the correct check character. If the checksum is incorrect, the decoder 10 is completely reinitialized and returns to Front End operation. If the checksum is valid, the decoder 10 becomes idle until the entry/exit logic 130 signals that the operator has removed the label from the scanning target area. At this time, the data in the digit buffer 120 is taken by an interface unit external to the decoder and the decoder is placed in an idle state as indicated by a logic true condition of the flag QIDLE.

The Back End and entry/exit logic 138 is not shown in FIG. 8 since it is not pertinent to the description of the subject invention.

Detailed Functional Examples

To further aid in explaining the operation of decoder 10, the step by step operation of the action of the decision "tree" is given by way of two different examples. The first illustrates the fail condition response and the second illustrates the successful acquisition of a complete label half of a UPC label.

A review of how the program makes the decision on allowable bar sizes would be helpful. The widths of all the bars in the UPC label that encode the numeric information are required to be an even multiple of the unit module width (i.e. 1, 2, 3 or 4 module widths). By definition, there are a total of seven unit module widths required per encoded digit. This total is the sum of the black modules and white modules.

Also, there are four bars required for each encoded digit, two white bars and two black bars, alternating within the character. Each character must have seven modules and four bars. It follows that the largest allowable bar is four modules. This is because if one bar is four modules, there are only three modules left and there are still three bars required. Since each bar has to be at least one module wide, there are just enough modules left for three-one module bars.

This is the scheme used by the program to deduce which bar sizes are allowable for the next bar. Some examples follow:

| Ex | Bar Being Considered | Bar Size (Modules) | Total Modules Used | Modules Left | Bars Left | Bar Sizes Allowed for Next bar |
|---|---|---|---|---|---|---|
| 1. | First | 3 | 3 | 4 | 3 | 1,2 |
|  | Second | 2 | 5 | 2 | 2 | 1 |
|  | Third | 1 | 6 | 1 | 1 | 1 |
|  | Fourth | 1 | 7 | 0 | 0 | — |
| 2. | First | 1 | 1 | 6 | 3 | 1,2,3,4 |
|  | Second | 1 | 2 | 5 | 2 | 1,2,3,4 |
|  | Third | 1 | 3 | 4 | 1 | 4 |
|  | Fourth | 4 | 7 | 0 | 0 | — |
| 3. | First | 2 | 2 | 5 | 3 | 1,2,3 |

-continued

| Ex | Bar Being Considered | Bar Size (Modules) | Total Modules Used | Modules Left | Bars Left | Bar Sizes Allowed for Next bar |
|---|---|---|---|---|---|---|
| | Second | 2 | 4 | 3 | 2 | 1,2 |
| | Third | 1 | 5 | 2 | 1 | 2 |
| | Fourth | 2 | 7 | 0 | 0 | — |

Example I:

-continued

| W | 3 ⎫ | First four bars should |
| B | 2 | constitute a valid UPC |
| W | 1 ⎬ | character. In this case, |
| B | 3 | the black 3 is an illegal |
| W | 2 ⎭ | bar size. |

Each of the following examples represents the change due to a single color change clock, XCCC. The program ROM 100 outputs are derived directly from the ROM program listing, Table No. 8, which follows:

TABLE NO. 8

| ROM ADDR | CONTENTS | ROM ADDR | CONTENTS | ROM ADDR | CONTENTS | ROM ADDR | CONTENTS |
|---|---|---|---|---|---|---|---|
| 00 | A788 | | | 7F | 6798 | BF | F7F8 |
| 01 | 17F8 | 40 | A788 | 80 | 9788 | C0 | A788 |
| 02 | 27F8 | 41 | 17F8 | 81 | 37F8 | C1 | 37F8 |
| 03 | 6F88 | 42 | 27F8 | 82 | C788 | C2 | 4FB8 |
| 04 | 17F8 | 43 | 3FB8 | 83 | ED8A | C3 | 4522 |
| 05 | 6F88 | 44 | 3FB8 | 84 | C788 | C4 | 4FB8 |
| 06 | 8F88 | 45 | 3FB8 | 85 | 1188 | C5 | 1020 |
| 07 | 098C | 46 | EFB8 | 86 | 9F88 | C6 | 57B8 |
| 08 | 0780 | 47 | 0824 | 87 | 0000 | C7 | 1090 |
| 09 | 0000 | 48 | 5798 | 88 | 0000 | C8 | 1114 |
| 0A | 0000 | 49 | 5798 | 89 | 0000 | C9 | 87F8 |
| 0B | 0780 | 4A | 0894 | 8A | 0000 | CA | 108C |
| 0C | C788 | 4B | 17FC | 8B | 0000 | CB | 1408 |
| 0D | 0002 | 4C | 0910 | 8C | D788 | CC | AF88 |
| 0E | 4280 | 4D | 7F88 | 8D | 0002 | CD | 0010 |
| 0F | 0110 | 4E | 0A8C | 8E | 4280 | CE | 0115 |
| 10 | 011C | 4F | 0888 | 8F | 0110 | CF | 0118 |
| 11 | 0120 | 50 | 0C0C | 90 | 011C | D0 | 0124 |
| 12 | 012C | 51 | 0000 | 91 | 0120 | D1 | 0128 |
| 13 | 0130 | 52 | 0000 | 92 | 0128 | D2 | 0134 |
| 14 | 013C | 53 | 0000 | 93 | 0134 | D3 | 0138 |
| 15 | 0200 | 54 | 0000 | 94 | 4138 | D4 | 017C |
| 16 | 0080 | 55 | 0000 | 95 | 0200 | D5 | 0170 |
| 17 | 0000 | 56 | 0000 | 96 | 0080 | D6 | 016C |
| 18 | 0000 | 57 | 0000 | 97 | 0000 | D7 | 0160 |
| 19 | 0000 | 58 | 0000 | 98 | 0000 | D8 | 015C |
| 1A | 0000 | 59 | 0000 | 99 | 0000 | D9 | 0150 |
| 1B | 0000 | 5A | 0000 | 9A | 0000 | DA | 0080 |
| 1C | 0000 | 5B | 0000 | 9B | 0000 | DB | 0380 |
| 1D | 0780 | 5C | 0000 | 9C | 0000 | DC | 0000 |
| 1E | 098C | 5D | 0780 | 9D | 0000 | DD | 7F98 |
| 1F | 8F88 | 5E | 0824 | 9E | 0000 | DE | 1288 |
| 20 | A788 | 5F | EFB8 | 9F | 9F88 | DF | 57B8 |
| 21 | 17F8 | 60 | A788 | A0 | A788 | E0 | A788 |
| 22 | 27F8 | 61 | 17F8 | A1 | 37F8 | E1 | 37F8 |
| 23 | 1FF8 | 62 | 27F8 | A2 | 1FF8 | E2 | 6F98 |
| 24 | 2FF8 | 63 | F798 | A3 | 25C6 | E3 | 5D16 |
| 25 | 2FF8 | 64 | F798 | A4 | 2FF8 | E4 | 6F98 |
| 26 | 37F8 | 65 | F798 | A5 | 1344 | E5 | 1214 |
| 27 | 0F48 | 66 | 6798 | A6 | 3FF8 | E6 | 7798 |
| 28 | 47B8 | 67 | 0A10 | A7 | 1424 | E7 | 128C |
| 29 | 47B8 | 68 | 17F8 | A8 | 14A0 | E8 | 1388 |
| 2A | 0C20 | 69 | 7788 | A9 | 0000 | E9 | 0000 |
| 2B | 5F98 | 6A | 0A88 | AA | 1110 | EA | 0000 |
| 2C | 0CA4 | 6B | 0780 | AB | 1494 | EB | 0000 |
| 2D | 5F98 | 6C | 0B8C | AC | 8798 | EC | 0000 |
| 2E | 0B90 | 6D | 0002 | AD | 118C | ED | 0002 |
| 2F | 0914 | 6E | 4280 | AE | 1208 | EE | 4280 |
| 30 | 0C90 | 6F | 0110 | AF | 100C | EF | 0110 |
| 31 | 0688 | 70 | 011C | B0 | 1308 | F0 | 011C |
| 32 | 9788 | 71 | 0120 | B1 | B788 | F1 | 0124 |
| 33 | 0988 | 72 | 012C | B2 | CF88 | F2 | 0128 |
| 34 | 9F88 | 73 | 9134 | B3 | FFF8 | F3 | 0134 |
| 35 | 0808 | 74 | 4138 | B4 | A788 | F4 | 0138 |
| 36 | 0B0C | 75 | 0200 | B5 | 0F88 | F5 | 0200 |
| 37 | 0A0C | 76 | 0080 | B6 | DF88 | F6 | 0080 |
| 38 | 8788 | 77 | 0000 | B7 | 1688 | F7 | 0000 |
| 39 | AF88 | 78 | 0000 | B8 | 8F88 | F8 | 0000 |
| 3A | B788 | 79 | 0000 | B9 | 0000 | F9 | 0000 |
| 3B | BF88 | 7A | 0000 | BA | 0000 | FA | 0000 |
| 3C | 0000 | 7B | 0000 | BB | 0000 | FB | 0000 |
| 3D | 17F8 | 7C | 0000 | BC | 0000 | FC | 0000 |
| 3E | 17F8 | 7D | 0780 | BD | 67B8 | FD | BF88 |
| 3F | FFF8 | 7E | 0A10 | BE | 1394 | FE | 0000 |
| | | | | | | FF | 7798 |

This example assumes the following bars seen by the Bar Width Measurer Unit: Color Bar Size

| B | 1 ⎫ | |
| W | 1 ⎬ | Guard Bar Pattern |
| B | 1 ⎭ | |

For example, at ROM address 2BH (hexadecimal), the ROM 100 output is 5F98H. The output breaks down as follows:

'A' DATA
- XA4  0
- XA3  1
- XA2  0   } 5
- XA1  1
- XA0  1

'V' DATA
- XV3  1
- XV2  1   } F
- XV1  1
- XV0  1

'E' DATA
- XE3  0
- XE2  0   } 9
- XE1  1
- XE0  1

- XP   0
- XM   0   } 8
- XNS  0

This output implies that the 'A' data is 0BH (hexadecimal), the 'V' data is FH (NOP instruction), the 'E' data is 3H (the next bar must be a 1 or 2 to be valid), the parity, XP, is 0 (odd parity), XM is 0 (no funny convert), and XNS, which is not pertinent to the subject invention.

| Color | Bar Size | |
|---|---|---|
| B | 1 | |
| W | 1 | Guard Bar Pattern |
| B | 1 | |
| W | 3 | |
| B | 2 | |
| W | 1 | 0 |
| B | 1 | |
| W | 2 | |
| B | 2 | |
| W | 2 | 1 |
| B | 1 | |
| W | 2 | |
| B | 1 | |
| W | 2 | 2 |
| B | 2 | |
| W | 1 | |
| B | 4 | |
| W | 1 | 3 |
| B | 1 | |
| W | 1 | |
| B | 1 | |
| W | 3 | 4 |
| B | 2 | |
| W | 1 | |
| B | 2 | |
| W | 3 | 5 |
| B | 1 | |
| W | 1 | |
| B | 1 | |
| W | 1 | Center Pattern |
| B | 1 | |
| W | 1 | |

EXAMPLE I.

| Video Data | | | | | ROM Address | ROM Output | XHFFL | 'A' Data | 'V' Data | 'E' Data | XP | XN | XNS | Comments |
|---|---|---|---|---|---|---|---|---|---|---|---|---|---|---|
| XLarge | XSmall | XBlk | XBS1 | XBS0 | | | | | | | | | | |
| 1 | 0 | 0 | 0 | 1 | 00 | A788 | 1 | 10100 | 1111 | 0001 | 0 | 0 | 0 | White 1 - ROM Addr = 00 because XHFFF is high Xlarge causes XHFFL & occurs at the start of every label. |
| 0 | 0 | 1 | 0 | 1 | B4 | A788 | 0 | 10100 | 1111 | 0001 | 0 | 0 | 0 | Black 1 - NOP allowable bar size (BS)=1 |
| 0 | 0 | 0 | 0 | 1 | 34 | 9F88 | 0 | 10011 | 1111 | 0001 | 0 | 0 | 0 | White 1 - NOP BS=1 |
| 0 | 0 | 1 | 0 | 1 | B3 | FFF8 | 0 | 11111 | 1111 | 1111 | 0 | 0 | 0 | Black 1 - NOP. BS=1,2,3, or 4. Guard bar pattern has been recognized, so next bar will be first bar of a digit. |
| 0 | 0 | 0 | 1 | 1 | 7F | 6798 | 0 | 01100 | 1111 | 0011 | 0 | 0 | 0 | White 3 - NOP. BS=1,2 |
| 0 | 0 | 1 | 1 | 0 | CC | AF88 | 0 | 10101 | 1111 | 0001 | 0 | 0 | 0 | Black 2 - NOP. BS=1 |
| 0 | 0 | 0 | 0 | 1 | 35 | 0808 | 0 | 00001 | 0000 | 0001 | 0 | 0 | 0 | White 1 - next clock will store a zero (V data=0) if no fail occurs BS=1 |
| 0 | 0 | 1 | 1 | 1 | E1 | 37F8 | 1 | 00110 | 1111 | 1111 | 0 | 0 | 0 | Black 3 - A '0' is stored as a result of the previous 'V' data, but half fail (XHFFL) goes up because of bad bar size. |
| 0 | 0 | 0 | 1 | 0 | 00 | A788 | 1 | 10100 | 1111 | 0001 | 0 | 0 | 0 | White 2 - ROM Addr. forced to 00 and all logic is reset by XHFFL. |

Example II: will follow the program through acquisition of a complete label half as shown below:

EXAMPLE II.

| Video Data | | | | | ROM Address | ROM Output | XHFFL | 'A' Data | 'V' Data | 'E' Data | XP | XN | XNS | Comments |
|---|---|---|---|---|---|---|---|---|---|---|---|---|---|---|
| XLarge | XSmall | XBlk | XBS1 | XBS0 | | | | | | | | | | |
| 1 | 0 | 0 | 0 | 1 | ϕϕ | A788 | 1 | 10100 | 1111 | 0001 | 0 | 0 | 0 | White 1 - Label start-up |
| 0 | 0 | 1 | 0 | 1 | B4 | A788 | 0 | 10100 | 1111 | 0001 | 0 | 0 | 0 | Black 1 - NOP. |

EXAMPLE II.-continued

| Video Data | | | | | ROM Address | ROM Output | XHFFL | 'A' Data | 'V' Data | 'E' Data | XP | XN | XNS | Comments |
| --- | --- | --- | --- | --- | --- | --- | --- | --- | --- | --- | --- | --- | --- | --- |
| XLarge | XSmall | XBlk | XBSI | XBS0 | | | | | | | | | | |
| 0 | 0 | 0 | 0 | 1 | 34 | 9F88 | 0 | 10011 | 1111 | 0001 | 0 | 0 | 0 | BS=1 White 1 - NOP. |
| 0 | 0 | 1 | 0 | 1 | B3 | FFF8 | 0 | 11111 | 1111 | 1111 | 0 | 0 | 0 | BS=1 Black 1 - NOP. BS=1,2,3,4. Next bar will be first bar of first digit. |
| 0 | 0 | 0 | 1 | 1 | 7F | 6798 | 0 | 01100 | 1111 | 0011 | 0 | 0 | 0 | White 3 - NOP. BS=1,2 |
| 0 | 0 | 1 | 1 | 0 | CC | AF88 | 0 | 10101 | 1111 | 0001 | 0 | 0 | 0 | Black 2 - NOP. BS=1 |
| 0 White 1 - next | 0 | 0 | 0 | 35 | 0808 | 0 | 00001 | 0000 | 0001 | 0 | 0 | 0 | | clock will load a zero. BS=1 |
| 0 | 0 | 1 | 0 | 1 | A1 | 37F8 | 0 | 00110 | 1111 | 1111 | 0 | 0 | 0 | Black 1 - 'φ' loaded into digit buffer. QLP set (first store digit XSTD. odd parity, XP=0). |
| 0 | 0 | 0 | 1 | 0 | 46 | EFB8 | 0 | 11101 | 1111 | 0111 | 0 | 0 | 0 | White 2 - NOP. BS=1,2,3 |
| 0 | 0 | 1 | 1 | 0 | DD | 7F98 | 0 | 01111 | 1111 | 0011 | 0 | 0 | 0 | Black 2 - NOP. BS=1,2 |
| 0 | 0 | 0 | 1 | 0 | 4F | 0888 | 0 | 00001 | 0001 | 0001 | 0 | 0 | 0 | White 2 - next clock will load '1'. BS=1 |
| 0 | 0 | 1 | 0 | 1 | A1 | 37F8 | 0 | 00110 | 1111 | 1111 | 0 | 0 | 0 | Black 1 - '1' loaded. BS=1,2,3,4 |
| 0 | 0 | 0 | 1 | 0 | 46 | EFB8 | 0 | 11101 | 1111 | 0111 | 0 | 0 | 0 | White 2 - NOP. BS=1,2,3 |
| 0 | 0 | 1 | 0 | 1 | BD | 67B8 | 0 | 01100 | 1111 | 0111 | 0 | 0 | 0 | Black 1 - NOP. BS=1,2,3 |
| 0 | 0 | 0 | 1 | 0 | 4C | 0910 | 0 | 00001 | 0010 | 0010 | 0 | 0 | 0 | White 2 - two will be loaded on next clock. BS=2 |
| 0 | 0 | 1 | 1 | 0 | C1 | 37F8 | 0 | 00110 | 1111 | 1111 | 0 | 0 | 0 | Black 2 - '2' loaded. BS=1,2,3,4 |
| 0 | 0 | 0 | 0 | 1 | 26 | 37F8 | 0 | 00110 | 1111 | 1111 | 0 | 0 | 0 | White 1 - NOP. BS=1,2,3,4 |
| 0 | 0 | 1 | 0 | 0 | 86 | 9F88 | 0 | 10011 | 1111 | 0001 | 0 | 0 | 0 | Black 4 - NOP. BS=1 |
| 0 | 0 | 0 | 0 | 1 | 33 | 0988 | 0 | 00001 | 0011 | 0001 | 0 | 0 | 0 | White 1 - three will be loaded on next clock. BS=1 |
| 0 | 0 | 1 | 0 | 1 | A1 | 37F8 | 0 | 00110 | 1111 | 1111 | 0 | 0 | 0 | Black 1 - '3' loaded. BS=1,2,3,4 |
| 0 | 0 | 0 | 0 | 1 | 26 | 37F8 | 0 | 00110 | 1111 | 1111 | 0 | 0 | 0 | White 1 - NOP. BS=1,2,3,4 |
| 0 | 0 | 1 | 0 | 1 | A6 | 3FF8 | 0 | 00111 | 1111 | 1111 | 0 | 0 | 0 | Black 1 - NOP. BS=1,2,3,4 |
| 0 | 0 | 0 | 1 | 1 | 67 | 0A10 | 0 | 00001 | 0100 | 0010 | 0 | 0 | 0 | White 3 - four will be loaded on next clock. BS=2 |
| 0 | 0 | 1 | 1 | 0 | C1 | 37F8 | 0 | 00110 | 1111 | 1111 | 0 | 0 | 0 | Black 2 - '4' loaded. BS=1,2,3,4 |
| 0 | 0 | 0 | 0 | 1 | 26 | 37F8 | 0 | 00110 | 1111 | 1111 | 0 | 0 | 0 | White 1 - NOP. BS=1,2,3,4 |
| 0 | 0 | 1 | 1 | 0 | C6 | 57B8 | 0 | 01010 | 1111 | 0111 | 0 | 0 | 0 | Black 2 - NOP. BS=1,2,3 |
| 0 | 0 | 0 | 1 | 1 | 6A | 0A88 | 0 | 00001 | 0101 | 0001 | 0 | 0 | 0 | White 3 - five will be loaded on next clock. BS=1 |
| 0 | 0 | 1 | 0 | 1 | A1 | 37F8 | 0 | 00110 | 1111 | 1111 | 0 | 0 | 0 | Black 1 - '5' loaded. BS=1,2,3,4. Xsixth occurs because this is the 6th digit loaded. |
| 0 | 0 | 0 | 0 | 1 | 0C | C788 | 0 | 11000 | 1111 | 0001 | 0 | 0 | 0 | White 1 - ROM address forced because Xsixth switched in special address mux. Xsixth goes away on this clock. |
| 0 | 0 | 1 | 0 | 1 | B8 | 8F88 | 0 | 10001 | 1111 | 0001 | 0 | 0 | 0 | Black 1 - NOP. BS=1. This is |

EXAMPLE II.-continued

| Video Data | | | | | ROM Address | ROM Output | XHFFL | 'A' Data | 'V' Data | 'E' Data | XP | XN | XNS | Comments |
|---|---|---|---|---|---|---|---|---|---|---|---|---|---|---|
| XLarge | XSmall | XBlk | XBSI | XBS0 | | | | | | | | | | |
| 0 | 0 | 0 | 0 | 1 | 31 | 0688 | 0 | 00000 | 1101 | 0001 | 0 | 0 | 0 | the second bar of the center pattern. White 1 - half complete command. It will be clocked into the flags on the next clock. BS=1 |
| 0 | 0 | 1 | 0 | 1 | Aφ | A788 | 0 | 10100 | 1111 | 0001 | 0 | 0 | 0 | Black 1 - QLHC Set. (QLP . XHC sets QLHC). QLP was set when the first digit was stored. |
| 0 | 0 | 0 | 0 | 1 | 34 | 9F88 | 0 | 10011 | 1111 | 0001 | 0 | 0 | 0 | White 1 - last bar of center pattern. NOP., BS=1 |

We claim:

1. A reader-scanner system for detecting and decoding coded character information where each encoded character comprises a plurality of bars of alternating light reflective characteristics of one or more widths comprising:
   a. a light source for projecting a beam of light;
   b. a scan target area through which pass encoded objects to be scanned;
   c. a light-sensitive detector for detecting changes in the level of light reflected from objects at said scan target area which are scanned by said beam of light;
   d. means responsive to said detector for determining possible bar width and bar characteristic information of the object being scanned;
   f. means responsive to said bar width information to determine in real time valid sequences of said information comprising;
      multiple level decision making means which includes means for comparing incoming bar width and characteristic information with allowable bar width and characteristic values for the bar and characteristic information sequence developed to that point,
      means for failing any information sequence which is not allowable, and means for moving to the next and subsequent levels of the decision-making sequence so long as the information sequence is an allowable one, until the completion of the multi-level sequence at which time an individual character is uniquely defined.

2. A reader-scanner system for detecting and decoding coded character information where each encoded character comprises a plurality of bars of alternating light reflective characteristics of one or more widths comprising:
   a. a laser for projecting a narrow beam of light;
   b. a scan target area through which pass encoded objects to be scanned;
   c. a light-sensitive detector for detecting changes in the level of laser light reflected from objects at said scan target area;
   d. optical means for directing the light beam from said laser to said scan target area to scan said encoded objects;
   e. means responsive to said detector for determining possible bar width and bar characteristic information of the object being scanned;
   f. decoding means comprising means responsive to said bar width information determining means for comparing first bar width and characteristic information of the beginning of a possible valid encoded character sequence with allowable character bar widths and characteristics and means for failing said first bar width and characteristic information if it is not allowable;
   g. means for comparing the next sequential bar width and characteristic information with allowable character bar width and characteristic values for the sequence which contains said first bar width and characteristic information if the first bar width and characteristic information is allowable, and means for failing the first and second bar width and characteristic information if it is not allowable; and
   h. means for comparing subsequent bar width and characteristic information with allowable character bar width and characteristic sequences until a character is decoded or else the sequence is invalidated.

3. A reader-scanner system for detecting and decoding UPC coded character information where information is encoded as a plurality of bars of alternating light reflective characteristics of one or more widths, said UPC characterized by a symbol having edge and center bar patterns and character bar patterns comprising:
   a. a laser for projecting a narrow beam of light;
   b. a scan target area through which pass encoded objects to be scanned;
   c. a light-sensitive detector for detecting changes in the level of laser light reflected from objects at said scan target area;
   d. optical means for directing the light beam from said laser to said scan target area to scan said encoded objects;
   e. means responsive to said detector for determining possible bar width and bar characteristic information of the object being scanned;
   f. first decision tree means responsive to said bar width information determining means for detecting edge and center bar patterns;
   g. second decision tree means responsive to the bar width information determining means for determining valid sequences of UPC characters once a valid edge or center bar pattern is determined; and
   h. wherein said first and second decision tree means comprise multiple-level decision making means which includes means for comparing incoming bar width and characteristic information with allowable bar width and characteristic values for the bar and characteristic information sequence developed to that point, means for failing any information sequence which is not allowable, and means for moving to the next and subsequent levels of the decision-making sequence so long as the information sequence is an allowable one, until the completion of the multi-level sequence at which time an individual identification is uniquely defined.

* * * * *